(12) United States Patent
Kim et al.

(10) Patent No.: US 9,629,132 B2
(45) Date of Patent: Apr. 18, 2017

(54) METHOD AND DEVICE FOR TRANSMITTING REVERSE CONTROL SIGNAL IN MOBILE COMMUNICATION SYSTEM

(71) Applicant: Samsung Electronics Co., Ltd., Suwon-si, Gyeonggi-do (KR)

(72) Inventors: Soeng Hun Kim, Yongin-si (KR); Gert-Jan Van Lieshout, Staines (GB); Jae Hyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 181 days.

(21) Appl. No.: 14/347,825

(22) PCT Filed: Oct. 12, 2012

(86) PCT No.: PCT/KR2012/008307
§ 371 (c)(1),
(2) Date: Mar. 27, 2014

(87) PCT Pub. No.: WO2013/055145
PCT Pub. Date: Apr. 18, 2013

(65) Prior Publication Data
US 2014/0226613 A1 Aug. 14, 2014

Related U.S. Application Data

(60) Provisional application No. 61/546,532, filed on Oct. 12, 2011, provisional application No. 61/552,114, (Continued)

(51) Int. Cl.
*H04W 72/04* (2009.01)
*H04W 52/02* (2009.01)
(Continued)

(52) U.S. Cl.
CPC ....... *H04W 72/0413* (2013.01); *H04L 1/1812* (2013.01); *H04L 1/1861* (2013.01);
(Continued)

(58) Field of Classification Search
None
See application file for complete search history.

(56) References Cited

U.S. PATENT DOCUMENTS

2003/0147348 A1* 8/2003 Jiang ............... H04L 1/1841
370/229
2006/0200722 A1* 9/2006 Braun ............... H04L 1/0007
714/748

(Continued)

FOREIGN PATENT DOCUMENTS

CN 101617489 A 12/2009
CN 101617559 A 12/2009
(Continued)

OTHER PUBLICATIONS

Samsung, Discussion on CQI/SRS transmission during DRX, 3GPP TSG-RAN2 #75 meeting, R2-114180, Aug. 22-26, 2011, Athens, Greece.

(Continued)

*Primary Examiner* — Hassan Kizou
*Assistant Examiner* — Roberta A Shand
(74) *Attorney, Agent, or Firm* — Jefferson IP Law, LLP

(57) ABSTRACT

The present invention pertains to a method and device for transmitting a control signal, and a method for a terminal to transmit a control signal according to one embodiment of the present invention can comprise: a step for sensing a forced termination in a first subframe during active time; and a step in which if the forced termination is sensed and if, in a second subframe among a pre-set number of subframes after the first subframe, Channel Quality Indicator (CQI) trans- (Continued)

mission via a Physical Uplink Control Channel (PUCCH) is set, and if neither one among Hybrid Automatic Repeat Request (HARQ) feedback transmission and Physical Uplink Shared Channel (PUSCH) transmission is set in the second subframe, the CQI transmission is executed via the PUCCH. The embodiment of the present invention enables power consumption by the terminal to be reduced.

12 Claims, 16 Drawing Sheets

Related U.S. Application Data filed on Oct. 27, 2011, provisional application No. 61/553,359, filed on Oct. 31, 2011, provisional application No. 61/556,779, filed on Nov. 7, 2011, provisional application No. 61/563,345, filed on Nov. 23, 2011, provisional application No. 61/584,744, filed on Jan. 9, 2012, provisional application No. 61/592,568, filed on Jan. 30, 2012, provisional application No. 61/649,910, filed on May 21, 2012.

(51) Int. Cl.
| | | |
|---|---|---|
| *H04L 1/18* | (2006.01) | |
| *H04L 5/00* | (2006.01) | |
| H04L 1/00 | (2006.01) | |
| H04L 1/16 | (2006.01) | |

(52) U.S. Cl.
CPC .......... *H04L 1/1896* (2013.01); *H04L 5/0057* (2013.01); *H04W 52/0235* (2013.01); *H04L 1/0026* (2013.01); *H04L 1/1671* (2013.01); *Y02B 60/50* (2013.01)

(56) References Cited

U.S. PATENT DOCUMENTS

| | | | |
|---|---|---|---|
| 2009/0239566 A1* | 9/2009 | Pelletier et al. | ............... 455/517 |
| 2010/0050034 A1* | 2/2010 | Che | ....................... H04L 1/1845 714/748 |
| 2010/0093386 A1 | 4/2010 | Damnjanovic et al. | |
| 2010/0103901 A1 | 4/2010 | Miki et al. | |
| 2010/0246491 A1* | 9/2010 | Bae | ....................... H04L 1/1845 370/328 |
| 2011/0051609 A1 | 3/2011 | Ishii et al. | |
| 2011/0076962 A1 | 3/2011 | Chen et al. | |
| 2011/0081939 A1 | 4/2011 | Damnjanovic et al. | |
| 2011/0249578 A1* | 10/2011 | Nayeb Nazar et al. | ...... 370/252 |
| 2011/0250910 A1 | 10/2011 | Lee et al. | |
| 2011/0299415 A1 | 12/2011 | He et al. | |
| 2012/0113831 A1* | 5/2012 | Pelletier et al. | ............... 370/252 |
| 2013/0051289 A1* | 2/2013 | Hsieh | .................... H04L 1/1845 370/280 |
| 2013/0070682 A1 | 3/2013 | Kim et al. | |
| 2014/0198701 A1* | 7/2014 | Ostergaard et al. | .......... 370/311 |
| 2014/0355573 A1* | 12/2014 | Wong et al. | .................. 370/336 |
| 2015/0181571 A1* | 6/2015 | Park et al. | .................... 370/336 |

FOREIGN PATENT DOCUMENTS

| | | |
|---|---|---|
| KR | 10-2010-0126509 A | 12/2010 |
| KR | 10-2010-0133477 A | 12/2010 |
| KR | 10-2010-0137531 A | 12/2010 |
| KR | 10-2011-0109992 A | 10/2011 |
| RU | 2 426 251 C2 | 8/2011 |
| WO | 2010/087674 A2 | 8/2010 |
| WO | 2011/038272 A1 | 3/2011 |
| WO | 2011/093666 A2 | 8/2011 |
| WO | 2011/155784 A2 | 12/2011 |

OTHER PUBLICATIONS

Ericsson et al.; CSI and SRS reporting at unexpected DRX state change; 3GPP TSG-RAN WG2 #75bis; R2-115438; Oct. 10-14, 2011; XP050540889; Zhuhai, China.

Samsung; Discussion on mandating CSI/SRS transmission during uncertain period; 3GPP TSG-RAN WG2 Meeting #79bis; R2-124687; Oct. 8-12, 2012; Bratislava, Slovakia.

Intel Corporation; Enhancements in DRX operation; 3GPP TSG-RAN2 Meeting #79bis; R2-124974; Oct. 8-12, 2012; Bratislava, Slovakia.

\* cited by examiner

METHOD AND DEVICE FOR TRANSMITTING REVERSE CONTROL SIGNAL IN MOBILE COMMUNICATION SYSTEM

TECHNICAL FIELD

The present invention relates to a method and apparatus for transmitting uplink control single in a mobile communication system.

BACKGROUND ART

Mobile communication systems were developed to provide the subscribers with communication services on the move. With the rapid advance of technologies, the mobile communication systems have evolved to support high speed data communication services beyond the standard voice communication services.

Recently, standardization for a Long Term Evolution (LTE) system, as one of the next-generation mobile communication systems, is underway in the 3$^{rd}$ Generation Partnership Project (3GPP). LTE is a technology for realizing high-speed packet-based communications with the data rate of up to 100 Mbps, which is higher than the currently available data rate, and its standardization is almost complete.

In the wireless mobile communication system, it is very important reduce power consumption. In order to achieve this, the LTE mobile communication system adopts discontinuous reception in which the terminal transmits uplink control signal only in active time during the discontinuous reception cycle, thereby minimizing power consumption of the terminal.

The present invention proposes a method and apparatus for reducing complexity and cost of the terminal and minimizing power consumption by defining efficient terminal operation in the situation of increasing forcibly the processing capability of the terminal unnecessarily in the discontinuous reception process.

DISCLOSURE OF INVENTION

Technical Problem

An embodiment of the present invention aims to provide a method and apparatus for reducing power consumption of the terminal efficiently.

Solution to Problem

In accordance with an aspect of the present invention, a control signal transmission method of a terminal includes detecting a forced termination at a first subframe in active time and transmitting a Channel Quality Indicator (CQI) when the forced termination is detected, any CQI transmission is scheduled on Physical Uplink Control Channel (PUCCH) at a second subframe among a predetermined number of subframes after the first subframe, and neither HARQ Automatic Repeat reQuest (HARQ) feedback transmission nor Physical Uplink Shared Channel (PUSCH) is configured at the second subframe.

In accordance with another aspect of the present invention, a terminal of transmitting a control signal includes a control unit which detects a forced termination at a first subframe in active time, and a communication unit which detects the forced termination and transmits a Channel Quality Indicator (CQI) when the forced termination is detected, any CQI transmission is scheduled on Physical Uplink Control Channel (PUCCH) at a second subframe among a predetermined number of subframes after the first subframe, and neither HARQ Automatic Repeat reQuest (HARQ) feedback transmission nor Physical Uplink Shared Channel (PUSCH) is configured at the second subframe.

Advantageous Effects of Invention

According to an embodiment of the present invention, it is possible to reduce the power consumption and cost of the terminal by maintaining the processing capability of the terminal in association with the discontinuous reception operation at an appropriate level.

MODE FOR THE INVENTION

Detailed description of well-known functions and structures incorporated herein may be omitted to avoid obscuring the subject matter of the present invention. Exemplary embodiments of the present invention are described with reference to the accompanying drawings in detail. Prior to the explanation of the present invention, brief descriptions are made of LTE system and carrier aggregation.

Figure 1:
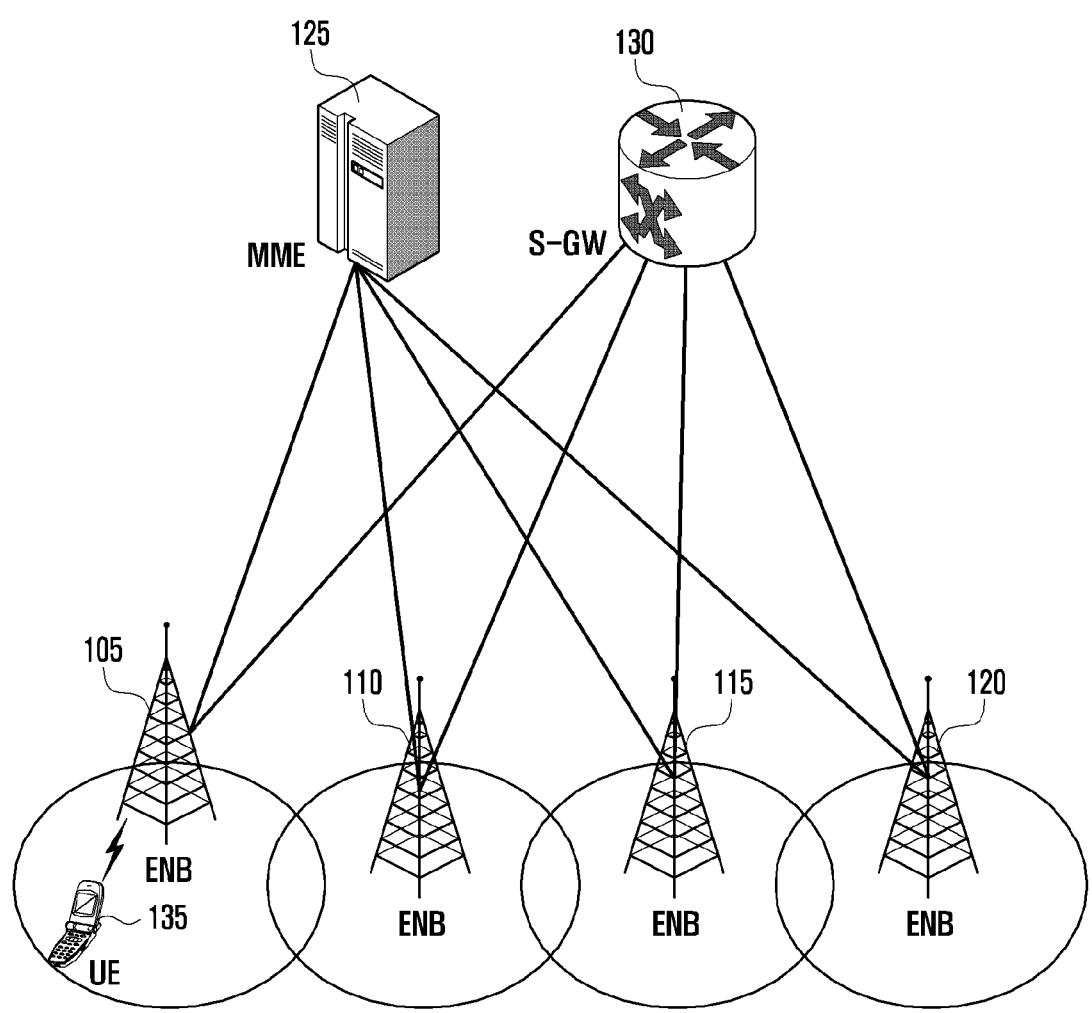
FIG. 1 is a diagram illustrating the architecture of the LTE system to which the present invention is applied.

FIG. 1 is a diagram illustrating the architecture of the LTE system to which the present invention is applied.

Referring to FIG. 1, the radio access network of the mobile communication system includes evolved Node Bs (eNBs) 105, 110, 115, and 120, a Mobility Management Entity (MME) 125, and a Serving-Gateway (S-GW) 130. The User Equipment (hereinafter, referred to as UE) 135 connects to an external network via eNBs 105, 110, 115, and 120 and the S-GW 130.

In FIG. 1, the eNBs 105, 110, 115, and 120 correspond to the legacy node Bs of the UMTS system. The eNBs 105, 110, 115, and 120 allow the UE to establish a radio link and are responsible for complicated functions as compared to the legacy node B. In the LTE system, all the user traffic including real time services such as Voice over Internet Protocol (VoIP) are provided through a shared channel and thus there is a need of a device which is located in the eNB to schedule data based on the state information such as UE buffer conditions, power headroom state, and channel state. Typically, one eNB controls a plurality of cells. In order to secure the data rate of up to 100 Mbps, the LTE system adopts Orthogonal Frequency Division Multiplexing (OFDM) as a radio access technology. Also, the LTE system adopts Adaptive Modulation and Coding (AMC) to determine the modulation scheme and channel coding rate in adaptation to the channel condition of the UE. The S-GW 130 is an entity to provide data bearers so as to establish and release data bearers under the control of the MME 125. MME 125 is responsible for various control functions and connected to a plurality of eNBs 105, 110, 115, and 120.

Figure 2:
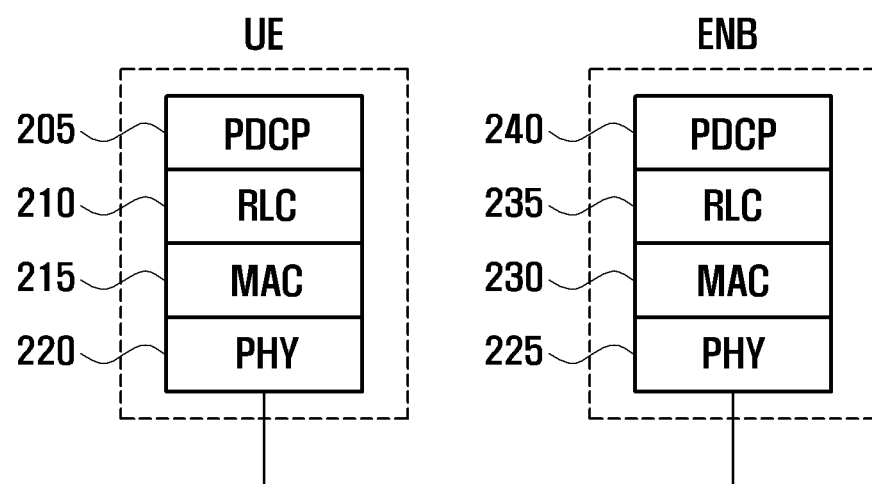
FIG. 2 is a diagram illustrating a protocol stack of the LTE system to which the present invention is applied.

FIG. 2 is a diagram illustrating a protocol stack of the LTE system to which the present invention is applied.

Referring to FIG. 2, the protocol stack of the LTE system includes Packet Data Convergence Protocol (PDCP) 205 and 240, Radio Link Control (RLC) 210 and 235, Medium Access Control (MAC) 215 and 230, and Physical (PHY) 220 and 225. The PDCP 205 and 240 is responsible for IP header compression/decompression, and the RLC 210 and 235 is responsible for segmenting the PDCP Protocol Data Unit (PDU) into segments in appropriate size for Automatic Repeat Request (ARQ) operation. The MAC 215 and 230 is responsible for establishing connection to a plurality of RLC entities so as to multiplex the RLC PDUs into MAC PDUs and demultiplex the MAC PDUs into RLC PDUs. The PHY 220 and 225 performs channel coding on the MAC PDU and modulates the MAC PDU into OFDM symbols to transmit over radio channel or performs demodulating and channel-decoding on the received OFDM symbols and delivers the decoded data to the higher layer.

Figure 3:
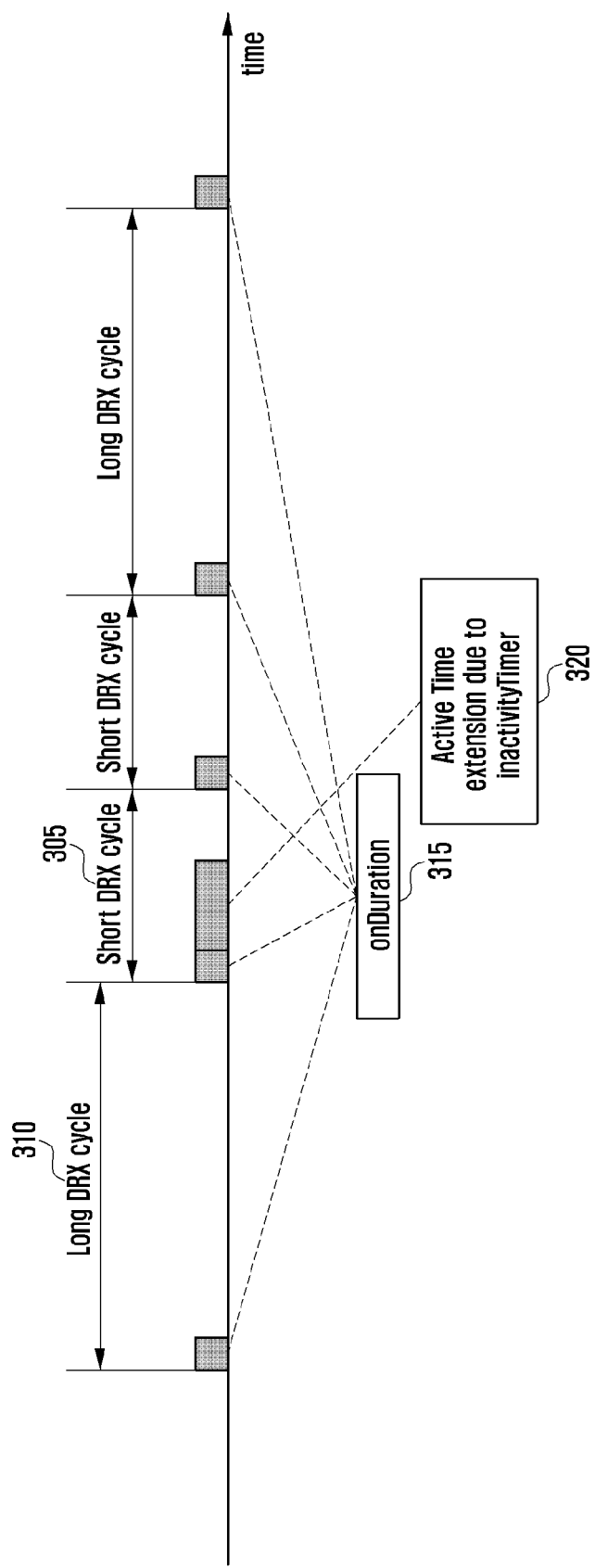
FIG. 3 is a diagram illustrating the discontinuous reception operation of the UE.

FIG. 3 is a diagram illustrating the discontinuous reception operation of the UE.

The discontinuous reception operation is the operation of monitoring downlink channel (Physical Downlink Control Channel; PDCCH) only for a predetermined duration and transmitting uplink signal concerning channel quality. Here, the uplink signal may include Channel Status Indicator/Information (CSI) and/or Sounding Reference Signal (SRS). The duration configured for monitoring the downlink scheduling channel is referred to as Active Time. With this method, it is possible to minimize the power consumption of the UE during the time out of the active time (hereinafter, referred to as non-Active Time).

The Active time appears in every Discontinuous Reception (DRX) cycle, and the period of the active time is determined depending on the traffic situation of the UE. For example, the UE use a short DRX cycle 350 for the case when a predetermined condition is fulfilled and a long DRX cycle 310 for the case when the condition is not fulfilled. Here, the short DRX cycle 305 as the duration shorter than that of the long DRX cycle 310.

Each DRX cycle includes an active time of relatively short duration so called on Duration 315 during which if a new data is scheduled the active time is extended by an inactivity timer (inactivityTimer) as denoted by reference number 320. The inactivity timer starts or restarts whenever new data is scheduled and, if the traffic increases, the UE extends the active time in match therewith.

The CSI denotes feedback concerning the downlink channel quality such as Channel Quality Indicator (CQI) and Rank Indicator (RI) and Multiple Input Multiple Output (MIMO) operation. The CSI is transmitted through Physical Uplink Control Channel (PUCCH) or Physical Uplink Shared Channel (PUSCH). Typically, the CSI includes CQI and, since the CQI is likely to cause any problem in the CSI, the terms CSI and CQI are used interchangeably in the same meaning.

The UE may be configured to transmit CSI using a predetermined PUCCH transmission resource at a predetermined. The UE operation of transmitting CSI through the indicated PUCCH transmission resource is referred to as CSI on PUCCH. If the subframe for CSI on PUCCH is reserved for uplink channel for transmitting PUSCH, user data, or MAC PDU, the UE has to transmit the CSI using a part of the PUSCH transmission resource for abiding by the single carrier transmission which is referred to as CSI on PUSCH.

<First Embodiment>

According to the current standard, the UE may not adjust CSI/SRS transmission for a certain duration when the active time ends and extends abruptly. For example, when the active time ends abruptly, the UE is likely to fail stopping CSI/SRS transmission although it has to.

In order to solve this problem, the present embodiment grants degree of freedom in CSI/SRS transmission for a predetermined duration when the active time of the UE ends or extends. However, this may cause a problem of compelling the eNB to perform so-called double decoding. For example, the eNB decodes a single under the assumption that the UE has not transmitted CSI/SRS and then decodes the signal again under the assumption that the UE has transmitted CSI/SRS. Such a process of decoding the same signal twice is referred to as double decoding. The present embodiment proposes a method of granting the degree of freedom for CSI/SRS transmission only when the CSI/SRS transmission is not overlapped with Hybrid Automatic Repeat reQuest (HARQ) feedback or PUSCH transmission in the $n^{th}$ subframe but performing CSI/SRS transmission when they are not overlapped in the case that the active time ends abruptly.

Figure 4:
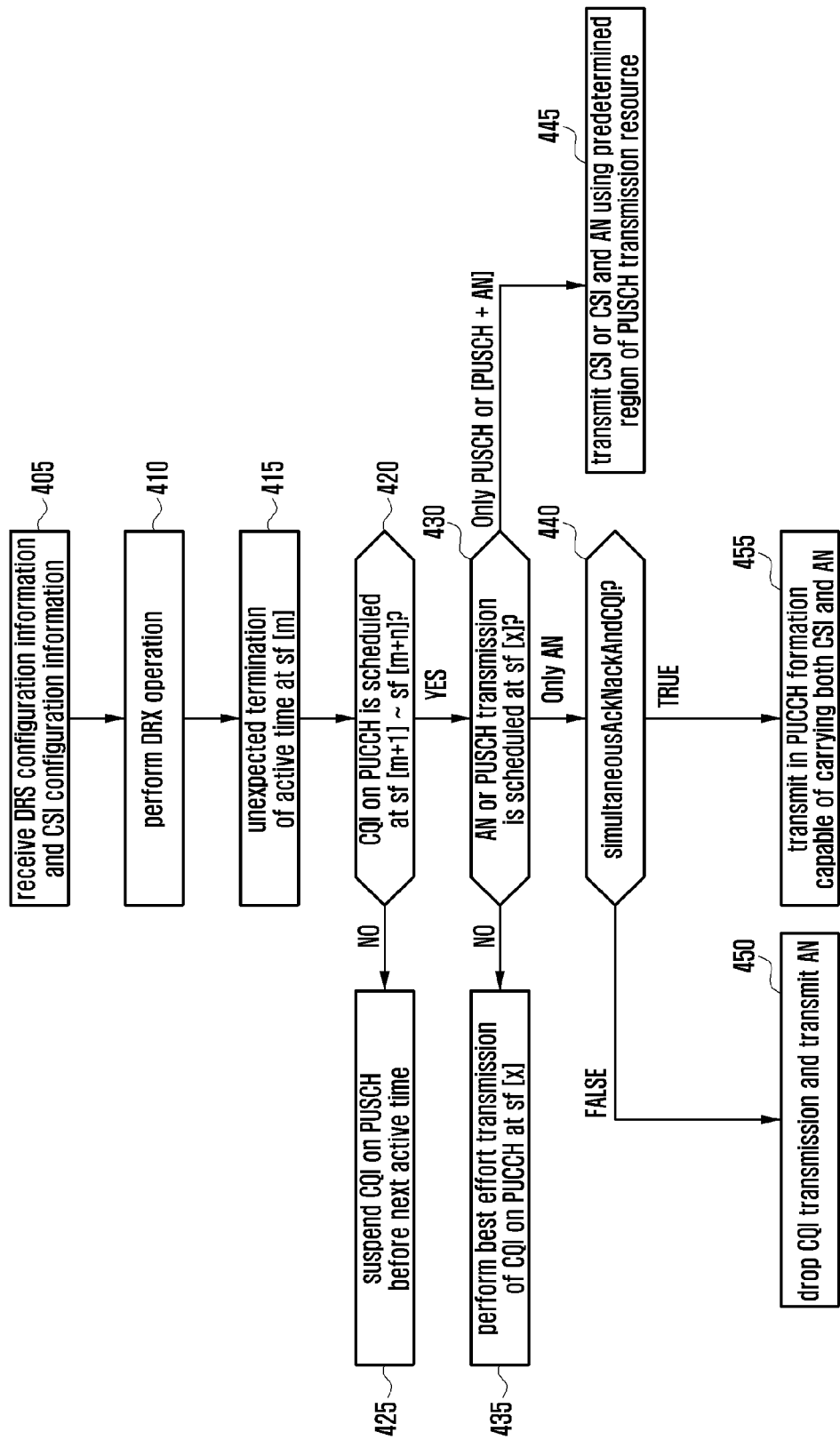
FIG. 4 is a flowchart illustrating a CSI transmission procedure when the active time of the UE ends according to the first embodiment of the present invention.

FIG. 4 is a flowchart illustrating a CSI transmission procedure when the active time of the UE ends according to the first embodiment of the present invention.

At step 405, the UE receives DRX configuration information and CSI configuration information from the eNB at a certain time point. The DRX configuration information includes at least one of the DRX cycle length, DRX start time calculation information, on Duration length, and inactivityTimer length.

The CSI configuration information includes at least one of the followings.

The information on the CQI transmission time may be given in the form of an index. For example, it is possible to predetermine the interval and offset mapped to index x and provides the use with the index. The UE acquires the CQI transmission time information using the received index.

CQI transmission resource information.

Indicator indicating whether to allow simultaneous transmission of CQI and HARQ ACK/NACK (simultaneousAckNackCQI) (hereinafter, referred to as simultaneous transmission allowance indicator)

If the above information is received, the Radio Resource Control (RRC) layer of the UE transfers the information to the MAC control device of the UE. At step 410, the MAC control device of the UE performs normal DRX operation and CQI transmission operation using the control information. That is, the MAC control device determines whether the current sub frame is the active time at every subframe. If the current subframe is the active time, the MAC control device monitors PDCCH and, if CQI transmission is configured, transmits CQI. In the following description, if CQI transmission is configured in a certain subframe, this means that periodic CQI transmission is reserved in the subframe according to the CQI configuration information. The UE performs normal DRX operation and undergoes unexpected termination (compulsive termination) of the active time at step 415. If the active time is terminated unexpectedly, this is one of two following cases. For explanation convenience, the subframe at which the active time is terminated unexpectedly is referred to as subframe m (hereinafter, sf[m]).

1. DRX MAC Control Element (CE) is transferred to the UE which maintains the active time due to non-expiry of the on DurationTimer or drx-inactivityTimer.

2. The UE maintaining the active time due to non-expiry of the HARQ retransmission timer receives PDCCH indicating HARQ retransmission.

DRX MAC CE is the MAC control information transmitted by the eNB to instruct the UE to stop the on DurationTimer and inactivityTimer. The active time starts for various reasons and is mostly extended by one of the two timers. Accordingly, the DRX MAC CE reception may cause the termination of the end of the active time in many cases. If the active time is maintained for other reasons than the running of the two timers, the UE does not terminate the active timer in spite of the receipt of DRX MAC CE.

The HARQ retransmission timer is the timer running for the UE to receive HARQ retransmission, and the UE maintains the active time while the timer is running. If the active time is maintained for other reason than the running of the HARQ retransmission timer, the UE does not terminate the active time in spite of the receipt of PDCCH indicating HARQ retransmission.

After the active time has been terminated unexpectedly, the UE determines whether periodic CQI transmission or CQI on PUCCH transmission is scheduled for the duration of a predetermined number of subframes (sf [m+1]~sf [m+n]) at step 420. If such a CQI transmission is not scheduled, the UE suspends the periodic PUCCH transmission or CQI on PUCCH transmission before the next active time at step 425.

If the CQI on PUCCH transmission is scheduled between sf [m+1] and sf [m+n], the procedure goes to step 430. Here, n denotes a parameter determined in consideration of the processing capability of the UE and is set to a value, e.g. 4, relatively large enough to be applied to all of the UEs including the UEs having low processing capability.

If n is set to 4, this means that all UEs have to stop CQI transmission after 4 subframes since the termination of the active time. For explanation convenience, the subframe in which CQI transmission is scheduled among the subframes between sf [m+1] and sf [m+n] is referred to as sf [x] if FIG. 4.

The UE determines whether nay HARQ feedback or PUSCH transmission is scheduled in sf [x] at step 430. For example, if the HARQ NACK or uplink grant for initial transmission or retransmission is received at sf [x], the UE transmits PUSCH at sf [x]. If PDSCH is received at sf [x−4], the UE transmits HARQ feedback (hereinafter, HARQ ACK/NACK or HARQ AN) at sf [x].

If none of HARQ feedback and PUSCH transmission is scheduled at sf [x], the procedure goes to step 435. If only the HARQ feedback is scheduled at sf [x], the procedure goes to step 440. If both the HARQ feedback and PUSCH transmission are scheduled or if only the PUSCH transmission is scheduled at sf [x], the procedure goes to step 445.

If the procedure goes to step 435, this is the case where the eNB is capable of predicting that UE transmits CQI but no other signals. Accordingly, although the UE performs the CQI on PUCCH transmission between sf [m+1] and sf [m+n], the eNB is not compelled to perform double decoding. Accordingly, the UE performs best effort CQI transmission at sf [x]. That is, the UE transmits CQI before the subframe at which it is possible to be aware of the termination of active time and stop CQI transmission.

If the procedure goes to step 440, this is the case where both the CQI and HARQ AN transmission are scheduled at sf [x] and the eNB knows that the UE transmits HARQ AN but does not know whether the UE transmits CQI. For example, the eNB cannot determine whether the UE transmit only AN due to the awareness of the expiry of active time or both the CQI and AN due to the unawareness of the expiry of the active time at sf [x]. If sf [x] is the active time, this means that the UE knows the fact that both the CQI and AN has to be transmitted already before 4 subframes. By taking notice that if sf [x−4] is the active time the sf [x] is likely to be the active time too rather than non-active time, it is preferred to transmit both the CQI and HARQ AN for preventing the double decoding of the eNB. If sf [x−4] is the active time, it is also preferred for the eNB to perform decoding under the assumption that the UE transmit both the CQI and AN independently of the active time. The UE determines whether the simultaneous transmission allowance indicator (simultaneousAckNackAndCQI) is set to TRUE at step 440. If this parameter is set to FALSE, the procedure goes to step 450. If simultaneous transmission allowance indicator (simultaneousAckNackAndCQI) is set to FALSE, this means that the eNB has command the UE to transmit AN with the give-up of CQI transmission, when the AN and CQI transmissions collided in the same subframe, to maintain the single carrier transmission characteristic of the UE. Since the UE has given up the CQI transmission before 4 subframes already, any CQI transmission-related problem does not occurs although the active time is terminated abruptly, and the UE transmits AN with give-up of CQI transmission at sf [x] at step 450.

If the simultaneous transmission allowance indicator (simultaneousAckNackAndCQI) is set to TRUE, the UE performs for transmitting both the CSI and AN at sf [x] at step 455. In detail, the UE selects PUCCH format for transmitting bot the CSI and AN using the resource allocated for CSI transmission and generates the PUCCH signal in the selected format, the PUCCH signal being transmitted at sf [x]. The PUCCH format for transmitting both the CSI and AN may be any of PUSCH formats 2a, 2b, and 3. If other PUCCH formats capable of transmitting both the CSI and AN are defined for use in the future, they also may be selected at step 455. The PUCCH formats are specified in the 3GPP TS 36.213 and 3GPP TS 36.211. Although it is difficult to be aware that the sf [x] is not the active time due to the low processing capability, the UE starts operation necessary for transmitting both the CSI and AN at sf [x–4] already by taking notice that the sf [x] is likely to be the active time because sf [x–4] is the active time.

If the procedure goes to step 445, this is the case where the UE knows, at sf [x–4], already that the PUSCH and CQI and/or AN have to be transmitted at sf [x]. If sf [x–4] is the active time, sf [x] is likely to be the active time rather than non-active time. Accordingly, the UE performs a procedure for transmitting PUSCH and CQI and/or AN at sf [x–4]. In more detail, the UE uses a part of the PUSCH transmission resource for CQI transmission or CQI and AN transmission. The resource region for use in transmission thereof may be determined in compliance with the rule as specified in the standard. The eNB also performs PUSCH decoding under the assumption that UE transmits the CQI or both the CQI and AN using the PUSCH at sf [x] by taking notice that sf [x] is likely to be the active time if the sf [x–4] is the active time.

Figure 5:
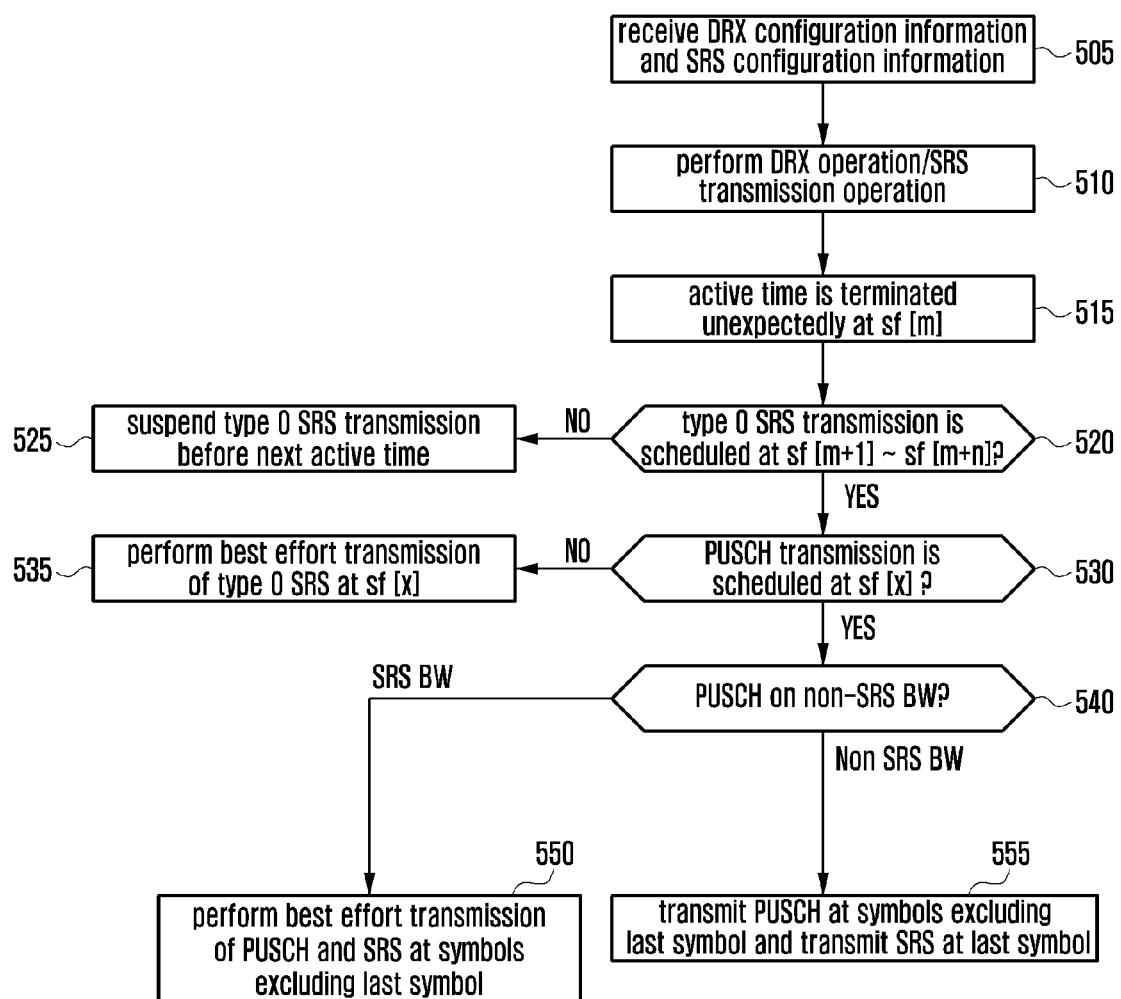
FIG. 5 is a flowchart illustrating the SRS transmission procedure of the UE when the active time is terminated according to the first embodiment of the present invention.

FIG. 5 is a flowchart illustrating the SRS transmission procedure of the UE when the active time is terminated according to the first embodiment of the present invention.

The UE receives DRX configuration information and type 0 SRS configuration information from the eNB at a certain time point at step 505. The type 0 SRS is the SRS transmitted periodically for a relatively long period and may include the following configuration informations. For reference, type 1 SRS is the SRS which the eNB command the transmission on PDCCH and transmitted predetermined times for short period unlike the type 0 SRS.

Figure 6:
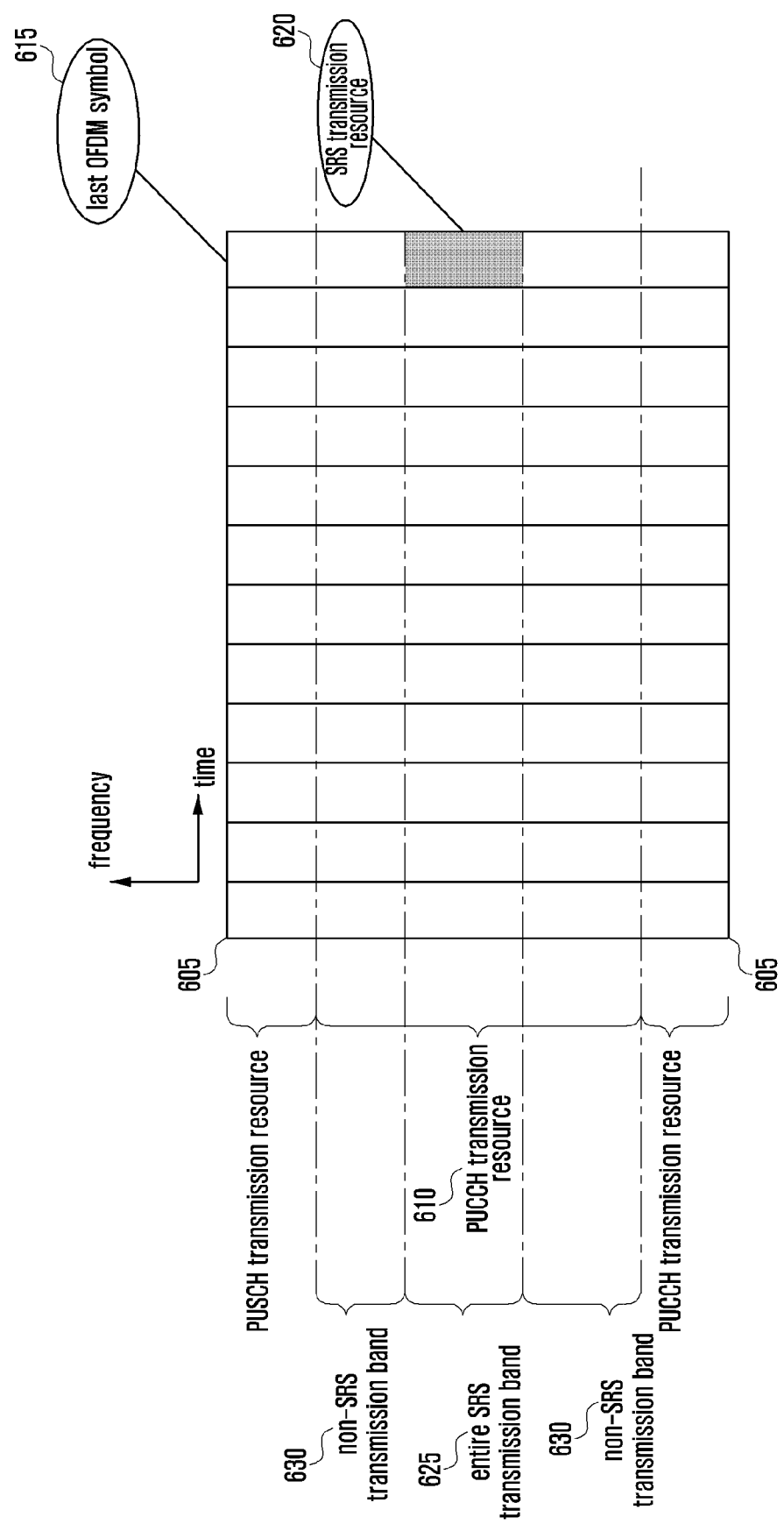
FIG. 6 is a diagram illustrating the subframe structure for SRS transmission.

Dedicated SRS transmission bandwidth
Index indicating information on SRS transmission time FIG. 6 is a diagram illustrating the subframe structure for SRS transmission.

In more detail, SRS is transmitted at the last OFDM symbol 615 of a certain subframe across the transmission bandwidth 625. The frequency resource of one subframe consists if the PUCCH transmission resource region 650 and the PUSCH transmission resource region 610. One subframe consists of a plurality of OFDM symbols, and the SRS transmission resource 620 may be configured to a part or whole of the PUSCH transmission resource of the last symbol 615. The SRS transmission resource is configured in certain frequency resources, and the entire bandwidth 625 of the SRS transmission resource is notified through system information. The UE transmits SRS across a part or whole of the SRS transmission bandwidth 625, and this is notified by the dedicated SRS transmission bandwidth information of the RRC message.

The UE determines the subframe and frequency resource for use in transmitting SRS based on the SRS transmission time information and dedicated transmission bandwidth information.

If the DRX configuration information and type 0 SRS configuration information are received, the RRC of the UE transfers these informations to the MAC control device. the MAC control device of the UE performs normal DRX operation and type 0 SRS transmission using the control information at step 510. That is, the RRC determines whether the subframe is the active time at every subframe and, if so, monitors PDCCH transmits SRS using the predetermined transmission resource of the last symbol according to the type 0 SRS transmission configuration. In the following description, if the type 0 SRS transmission is configured to a certain subframe, this means that the type 0 SRS transmission is scheduled in the subframe according to the type 0 SRS configuration information. The UE performs normal DRX operation and undergoes unexpected termination (compulsive termination) of the active time at step 515. In this case the procedure goes to step 520. For explanation convenience, the active time is terminated unexpectedly at sf[m].

After the active time has been terminated unexpectedly, the UE determines whether the type 0 SRS transmission is scheduled for a predetermined number of subframes (sf [m+1]~sf [m+n]) at step 520. If not scheduled, the UE suspends the type 0 SRS transmission before the next active time at step 525.

If the type 0 SRS transmission is scheduled between sf [m+1] and sf [m+n], the procedure goes to step 530. Here, n denotes a parameter determined in consideration of the processing capability of the UE and is set to a value, e.g. 4, relatively large enough to be applied to all of the UEs including the UEs having low processing capability.

If n is set to 4, this means that all UEs have to stop CQI transmission after 4 subframes since the termination of the active time. For explanation convenience, the subframe in which type 0 SRS transmission is scheduled among the subframes between sf [m+1] and sf [m+n] is referred to as sf [x] if FIG. 5.

The UE determines whether PUSCH transmission is scheduled at sf [x] at step 530. For example, if HARQ NACK or uplink grant for initial transmission or retransmission is received at sf [x–4], the UE perform PUSCH transmission at sf [x].

If PUSCH transmission is not scheduled at sf [x], the procedure goes to step 535 and, otherwise if the PUSCH transmission is scheduled in sf [x], the procedure goes to step 540.

In the case that the procedure goes to 535, the UE should not transmit the type 0 SRS between sf [m+1] and sf [m+n] but, although it transmit the type 0 SRS, the eNB is not required to perform double decoding. Accordingly, the UE performs best effort transmission of type 0 SRS at sf [x]. That is, the UE is aware of the expiry of the active time and performs type 0 SRS transmission before the subframe at which the type 0 SRS transmission can be terminated.

In the case that the procedure goes to step 540, this means that both the type 0 SRS transmission and PUSCH transmission are scheduled at sf [x] and the eNB knows that the UE transmits PUSCH but does not know whether the UE transmits SRS. For example, the eNB does not know whether the UE has check the expiry of the active time so as to transmit only the PUSCH or does no check the expiry of the active time so as to transmit both the PUSCH and type 0 SRS. If the sf [x] is the active time, the UE knows that both the type 0 srs and PUSCH have to be transmitted 4 subframes before already. Accordingly, if sf [x–4] is the active time, it is preferred to transmit both the type 0 SRS and PUSCH for preventing the double decoding of the eNB by taking notice that sf [x] is likely to be the active time rather than non-active time. If the sf [x–4] is the active time, it is also preferred for the eNB to perform decoding under the assumption that the UE transmits both the type 0 SRS and PUSCH regardless whether the sf [x] is the active time. The UE determines whether PUSCH is transmitted on the frequency band which is overlapped with the SRS transmission band or not at step 540. For example, the PUSCH transmission resource is allocated in the non-SRS transmission band 630, the procedure goes to step 555 and, otherwise if the PUSCH transmission resource is overlapped with the SRS transmission band 625 at least partially, step 550.

The UE transmits PUSCH at the symbols with the exception of the last symbol and perform best effort transmission of the type 0 SRS at the last symbol at step 550. This is because the PUSCH is transmitted at the symbols with the exception of the last symbol regardless whether the UE transmits the type 0 SRS or not and it is not necessary for the eNB to perform doubling decoding on PUSCH since the PUSCH transmission is scheduled on the type 0 SRS transmission band.

In the case that the procedure goes to step 555, the means that although SRS is not transmitted principle since the sf[x] is non-active time the UE may be aware of it or not. If the UE is aware of the expiry of the active time, it transmits PUSCH even at the last symbol and, otherwise, SRS other than PUSCH at the last symbol. Accordingly, the eNB has to perform double decoding for preparing for both the cases. In order to overcome this, the present invention proposes a method of transmitting both the PUSCH and SRS simultaneously regardless whether sf[x] is the active time since sf[x] is likely to be the active time if sf[x-4] is the active time. The UE transmits PUSCH at the symbols with the exception of the last symbol at which SRS is transmitted. In this case, the eNB performs decoding once under the assumption that the SRS is transmitted without double decoding.

Although the procedures of FIGS. 4 and 5 can be combined for being performed by one UE, it is also included in the range of the present invention to perform one of the two procedures selectively.

<Second Embodiment>

The UE uses the following parameters for acquiring synchronization with the eNB for PUSCH transmission.

HARQ_FEEDBACK: Parameter carrying HARQ feedback corresponding to PUSCH transmission. If HARQ_FEEDBACK is NACK, this means retransmission at next transmission timing; and otherwise if HARQ_FEEDBACK is ACK, this means that retransmission does not occur at the next transmission timing.

CURRENT_TX_NB: Parameter carrying the number of PUSCH transmission of the packet to which current HARQ process is applied. If the CURRENT_TX_NB reaches a predetermined threshold, the UE discards the corresponding packet from the buffer.

CURRENT_IRV: Parameter carrying Redundancy Version (RV) to be applied to the packet to which current HARQ process is applied. The UE applies RV indicated by the CURRENT_IRV for PUSCH transmission.

These parameters are updated whenever the UE receive HARQ_FEEDBACK or transmit PUSCH. If the UE fails transmitting PUSCH at the subframe at which PUSCH transmission is scheduled for a certain reason or receiving HARQ feedback at which the HARQ feedback is scheduled, how to update the parameters are not clear.

For various reasons, the scheduled PUSCH transmission may not be performed. For example, if the corresponding subframe belongs to the measurement gap or is overlapped with the LTE transmission autonomous denial duration at least partially, the UE does not perform uplink transmission at the corresponding subframe. For another example, if the duration for which the UE adjusts the bandwidth of the RF frontend for carrier aggregation is overlapped with the PUSCH transmission duration at least partially, the UE does not perform PUSCH transmission.

The measurement gap means the time duration for which the data transmission is suspended on the serving frequency in order for the UE to perform measurement on other frequency than the current serving frequency. The measurement gap is configured by the eNB if necessary, and the UE suspends transmission/reception in the serving cell at certain subframe according to the instruction of the eNB and performs measurement on other frequencies. According, if the UE fails PUSCH transmission due to the measurement gap, both the UE and the eNB are aware of this.

The autonomous denial means that the UE suspends LTE transmission for receiving important radio signal in other radio communication mode, e.g. beacon signal of wireless local area network and Bluetooth configuration control signal. Since the autonomous denial is performed the UE autonomously, the eNB does not know that the UE has denied PUSCH transmission autonomously.

The RF front end bandwidth adjustment occurs when the eNB configures a new serving cell to the UE or activates/deactivates the preconfigured serving cell. Since the eNB does not know exactly when the UE performs the RF frontend bandwidth adjustment, although the UE mutes PUSCH transmission for RF frontend bandwidth adjustment, the UE is not aware of this.

Like this, although the UE does not perform PUSCH transmission, the eNB may not aware of this. If the eNB know that the PUSCH transmission is not performed, it is preferred that the UE and the eNB maintain the CURRENT_IRV as it is. The uplink HARQ operation is defined such that a specific RV is applied automatically whenever the non-adaptive retransmission (retransmission which the UE performs using the transmission resource used previously, and if the NACK is received as feedback the UE perform non-adaptive retransmission basically) is performed. For example, the UE applies RV 0 for initial transmission, RV 2 for the first non-adaptive retransmission, and RV 3 for the second non-adaptive retransmission, and RV 1 for the third non-activity retransmission. The UE and the eNB determine the RV to be applied for the next retransmission using CURRENT_IRV. If CURRENT_IRV increments although the PUSCH transmission is not performed, the RV is likely to be omitted partially, resulting in reduction of performance. Accordingly, if the eNB knows that the UE has not performed PUSCH transmission, it is preferred to maintain CURRENT_IRV without increment.

Otherwise if the eNB does not know that the UE has not transmitted PUSCH, it is more important to increase CURRENT_IRV such that the UE and the eNB perform encoding and decoding using the same RV.

The goal of CURRENT_TX_NB is to prevent retransmission from occurring no more when the transmission has failed in spite of over a predetermined number of transmissions. If the number of transmissions of the current packet is equal to or greater than a predetermined threshold, the UE discards the packet from the HARQ buffer and does not perform retransmission any longer. If the number of transmissions of the current packet is equal to or greater than a predetermined threshold, the eNB determines that the non-adaptive retransmission of the packet is not performed any longer and allocates the frequency/time transmission resource allocated for the packet transmission to another UE. Accordingly, it is important for the UE and the eNB to check at the same time that the number of transmissions of the current packet becomes equal to or greater than the threshold and, in order to achieve this, the UE and the eNB manages CURRENT_TX_NB based on the number of passed retransmission occasions other than the number of actual PUSCH transmission times. That is, the UE and the eNB increase CURRENT_TX_NB by 1 whenever the transmission time of a certain packet has passed although the packet has not been transmitted actually. Accordingly, the UE increases CURRENT_TX_NB by 1 regardless whether or not the eNB knows that the UE has not transmitted PUSCH.

As far as the packet is not discarded from the buffer, although PUSCH transmission has been suspended, the UE monitors PDCCH and PHICH for determination on whether to perform retransmission. It is preferred to perform retransmission based on the control information received through the control channel. It is preferred to monitor PDCCH and PHICH selectively depending on the reason for suspension of PUSCH transmission.

Figure 7:
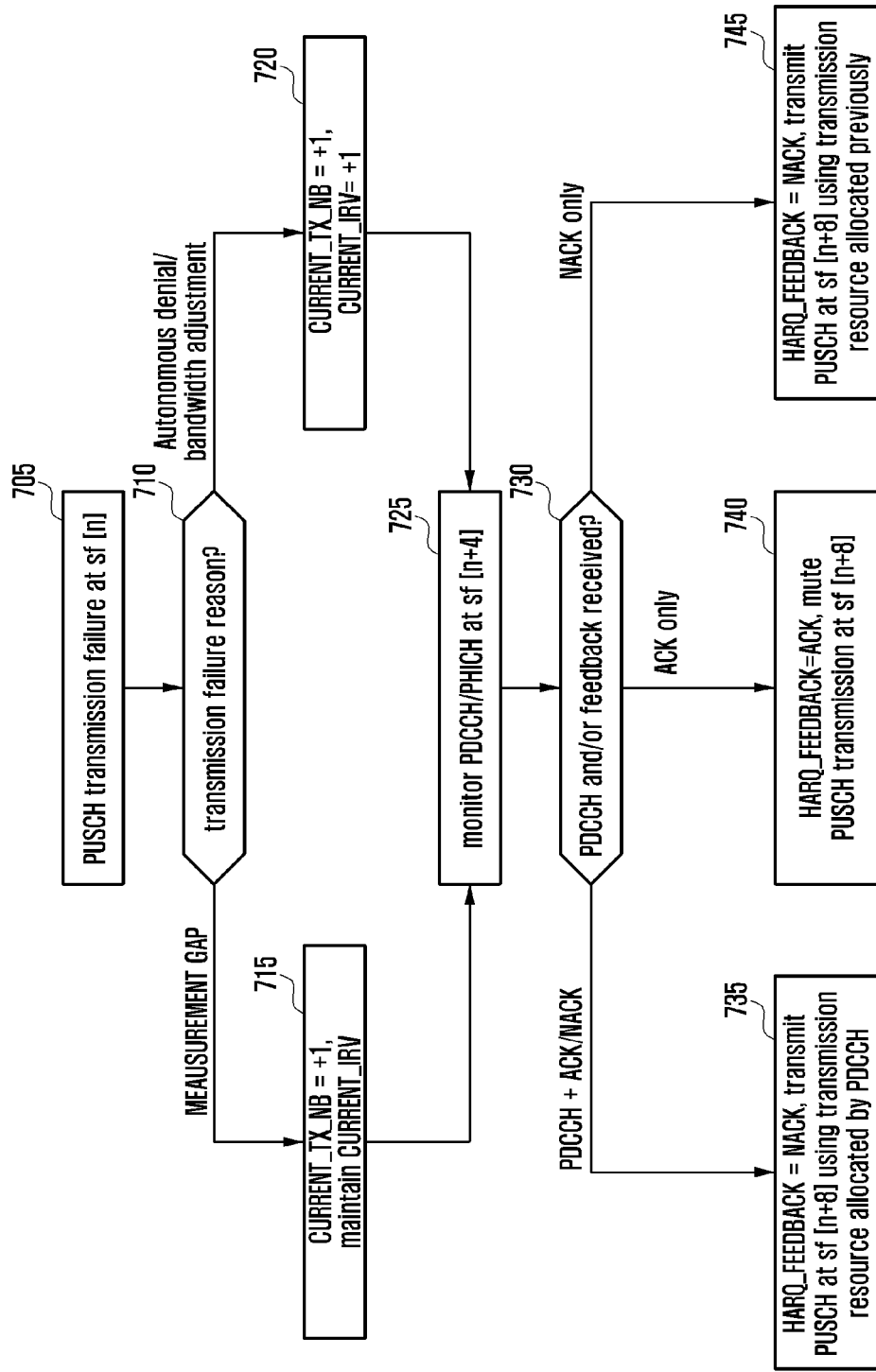
FIG. 7 is a flowchart illustrating a procedure of transmitting PUSCH according to the second embodiment of the present invention.

FIG. 7 is a flowchart illustrating a procedure of transmitting PUSCH according to the second embodiment of the present invention.

The UE is aware of the failure of PUSCH transmission scheduled at a certain subframe sf [n] at step 705.

The UE determines whether the reason for the PUSCH transmission failure at sf [n] is because of measurement gap, overlap of the sf [n] and autonomous denial, or RF frontend bandwidth adjustment at sf [n]. If the reason for the PUSCH transmission failure is because of the measurement gap, the procedure goes to step 715 and, otherwise if the reason for PUSCH transmission failure is because of the autonomous denial or RF frontend bandwidth adjustment, step 720.

In the case that the failed PUSCH transmission is the HARQ retransmission, the UE processes CURRENT_IRV and CURRENT_TX_NB as follows at step 715. If the scheduled PUSCH transmission is not performed at the corresponding subframe, the UE maintains the current value of CURRENT_IRV and increases CURRENT_TX_NB by 1. According to an alternative embodiment, the UE may perform update of CURRENT_IRV (i.e. determination of maintaining current value of CURRENT_IRV) at sf [n] and update of CURRENT_TX_NB at a certain time between sf [n−1] and sf [n]. As described above, this is because CURRENT_IRV is the parameter updated depending on whether actual transmission has been performed, and the CURRENT_TX_NB is the parameter updated regardless that actual transmission has been performed.

In the case that the failed PUSCH transmission is the initial transmission, the UE processes the CURRENT_IRV and CURRENT_TX_NB as follows at step 715. The UE initializes CURRENT_IRV and CURRENT_TX_NB to 0 and does not perform update any more.

In the case that the failed PUSCH transmission is HARQ retransmission, the UE processes CURRENT_IRV and CURRENT_TX_NB as follows at step 720. If the scheduled PUSCH transmission is not performed at the corresponding subframe, the UE increases both the CURRENT_IRV and CURRENT_TX_NB by 1. According to an alternative embodiment, the UE may perform update of CURRENT_IRV (i.e. increment of CURRENT_IRV by 1) at sf [n] and update of CURRENT_TX_NB at a certain time between sf [n−1] and sf [n]. According to another alternative embodiment, the UE receives HARQ feedback corresponding to the PUSCH transmission without update of CURRENT_IRV and then, if the HARQ feedback is NACK (i.e. if non-adaptive retransmission is indicated), increases CURRENT_IRV by 1 and, otherwise if the HARQ feedback is ACK (i.e. if non-adaptive retransmission is barred), maintains current value of CURRENT_IRV. That is, if the procedure goes to step 740, the UE maintains the current value of CURRENT_IRV and, otherwise if the procedure goes to step 745, increases CURRENT_IRV by 1. The HARQ feedback ACK is the command for the eNB to suspend performing retransmission before the receipt of retransmission command afterward. Since the retransmission command includes the information on the RV for use at the UE, it is not necessary to update CURRENT_IRV if the HARQ feedback is ACK. That is, if the UE has failed PUSCH transmission due to the autonomous denial and if the eNB has commanded non-adaptive retransmission of the PUSCH (or HARQ feedback NACK has been received or HARQ_FEEDBACK has been set to NACK), the UE adjusts CURRENT_IRV (i.e. adjusts it by 1); and if the has failed PUSCH transmission due to the autonomous denial and if the eNB has commanded to perform adaptive-retransmission of the PUSCH (or has received HARQ feedback ACK or HARQ_FEEDBACK has been set to ACK, the UE does not adjust CURRENT_IRV.

In the case that the failed PUSCH transmission is an initial transmission, the UE processes CURRENT_IRV and CURRENT_TX_NB as follows at step 720. The UE initializes CURRENT_TX_NB and CURRENT_IRV to 0 at a certain between sf [n−4] carrying the uplink grant indicating the initial transmission and sf [n] at which the initial transmission is scheduled. Afterward, the UE maintains the current value of CURRENT_TX_NB and increases CURRENT_IRV by 1 at sf [n]. Or, the UE may adjust CURRENT_IRV after receipt of HARQ feedback. That is, if the HARQ feedback is ACK (i.e. if the procedure goes to step 740), the UE maintains the current value of CURRENT_IRV and, otherwise if the HARQ feedback is NACK (i.e. if the procedure goes to step 745), adjusts CURRENT_IRV (e.g. increases CURRENT_IRV by 1).

The reason for updating CURRENT_TX_NB and CURRENT_IRV in different ways for the HARQ initial transmission and HARQ retransmission is because CURRENT_TX_NB relates to the transmission performed or should have been performed and CURRENT_IRV relates to the transmission to be performed.

The UE monitors PDCCH and PHICH at sf [n+4] at step 725. PDSCH is the channel carrying the scheduling command such as uplink grant and downlink assignment, PHICH is the channel carrying the HARQ feedback.

The UE determines whether PDCCH or HARQ feedback corresponding to the concerned packet at sf [n+4] at step 730. If both the PDCCH and HARQ feedback are received together, the procedure goes to step 735; if the HARQ ACK is received without PDCCH, the procedure goes to step 740; and if the HARQ NACK is received, the procedure goes to step 745. If the PDCCH corresponding to the concerned packet is received, this means that the uplink grant indicating adaptive retransmission of the concerned packet is received. If the PDCCH corresponding to the concerned packet is received, this means that the uplink grant for the HARQ process in which the packet is being processed.

At step 735, the UE performs PUSCH transmission (if possible) at sf [n+8] using the transmission resource and transmission formation indicated in the uplink grant without consideration of the actually receive HARQ feedback, i.e. by setting HARQ_FEEDBACK to NACK although HARQ ACK has been received. The reason for ignoring the actually received HARQ feedback is because it is preferred to give priority to the uplink grant information when the uplink grant protected with CRC and non-CRC protected HARQ feedback are received simultaneously. If the HARQ_FEEDBACK is set to NACK, this means that the uplink transmission is performed at the next transmission timing of the corresponding HARQ process; and if the HARQ_FEEDBACK is set to ACK, this means that the uplink transmission is not performed in the corresponding HARQ process until new uplink grant is received.

At step 740, the UE sets the HARQ_FEEDBACK to the actually received HARQ feedback value, i.e. ACK. The UE suspends transmission in the corresponding HARQ process until the transmission is instructed by uplink grant afterward.

At step 745, the UE sets the HARQ_FEEDBACK to the actually received HARQ feedback value, i.e. NACK. Afterward, the UE performs non-adaptive retransmission using the transmission resource allocated before the next transmission time of the corresponding HARQ process, i.e. sf [n+8].

If the eNB knows that the UE has not transmitted PUSCH, it is preferred to skip receiving PHICH and apply non-adaptive retransmission. If the UE has not transmitted PUSCH, there is no probability in which the eNB receives the packet successfully, and the UE has to perform retransmission. In this case, the UE skips receiving PHICH and the eNB skips transmitting PHICH to reduce power consumption and interference. Otherwise if the eNB does not know that the UE has transmitted PUSCH, the eNB transmits HARQ feedback and thus it is preferred for the UE to operate according to the HARQ feedback information.

Figure 8:
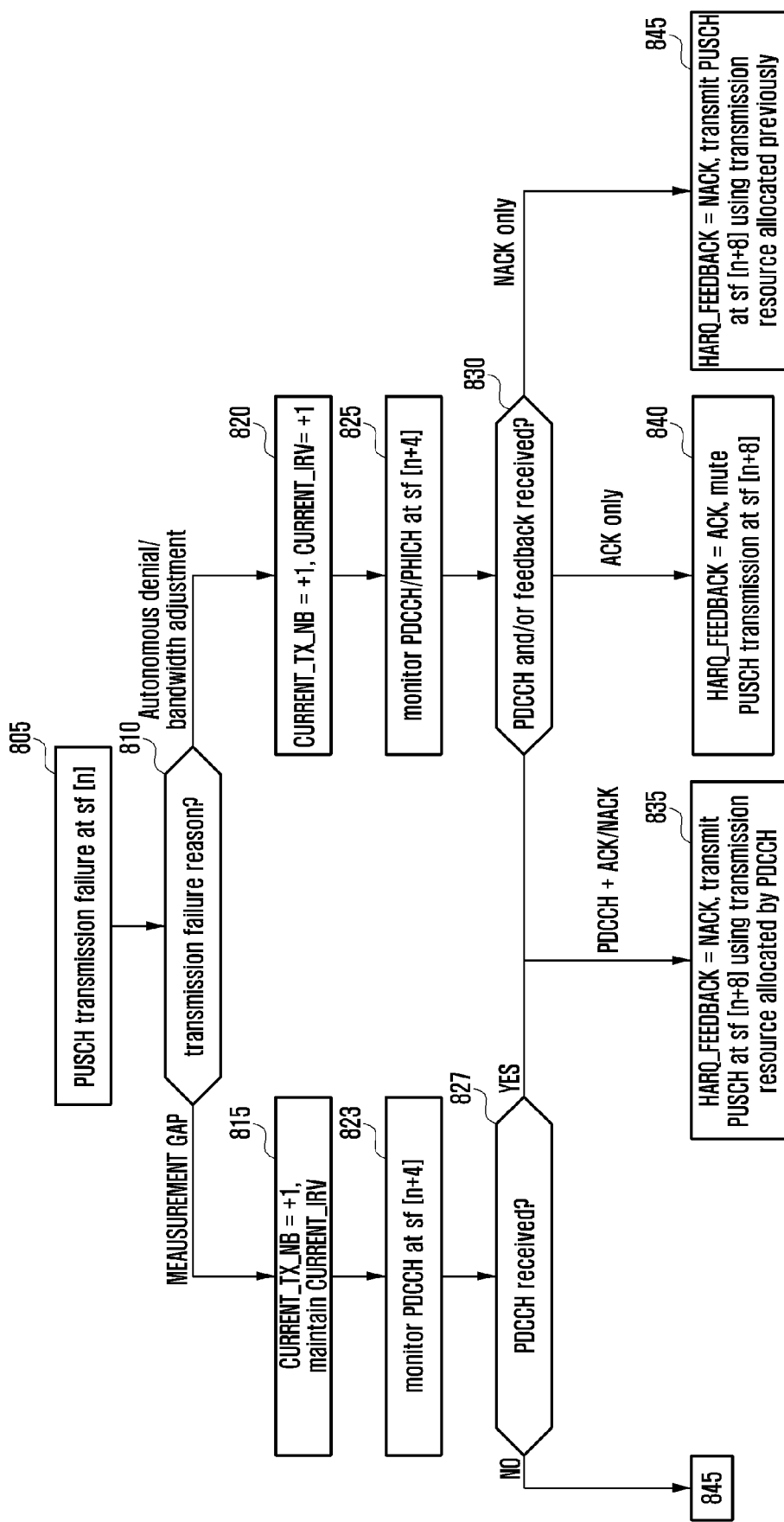
FIG. 8 is a flowchart illustrating a PUSCH transmission procedure according to a first alternative example of the second embodiment of the present invention.

FIG. 8 is a flowchart illustrating a PUSCH transmission procedure according to a first alternative example of the second embodiment of the present invention.

Since steps 805 and 810 are identical with steps 705 and 710 of FIG. 7, detailed descriptions thereon are omitted herein.

If the procedure goes to step 820, this means that the eNB does not know that the UE has not transmitted PUSCH. In this case, the UE performs operations of steps 820, 825, 830, 835, 840, and 845; and since these steps are identical with steps 720, 725, 730, 735, 740, and 745, detailed descriptions thereon are omitted herein.

If the procedure goes to step 815, this means that the eNB knows that the UE has not transmitted PUSCH. Step 815 is identical with step 715.

Afterward, the UE skips monitoring PHICH at sf [n+4], i.e. does not receive HARQ feedback, but monitors only PDCCH at step 823.

At step 872, the UE determines whether PDCCH is received and, if so, the procedure goes to step 835. Otherwise if PDCCH is not received, the procedure goes to step 845 at which the UE sets HARQ_FEEDBACK to NACK and performs non-adaptive retransmission.

If the UE fails receiving HARQ feedback due to the RF frontend bandwidth adjustment or autonomous denial, the UE operation is not clear. Particularly since the eNB does not know whether the UE has received HARQ feedback, it is required to design the operation in consideration thereof.

Figure 9:
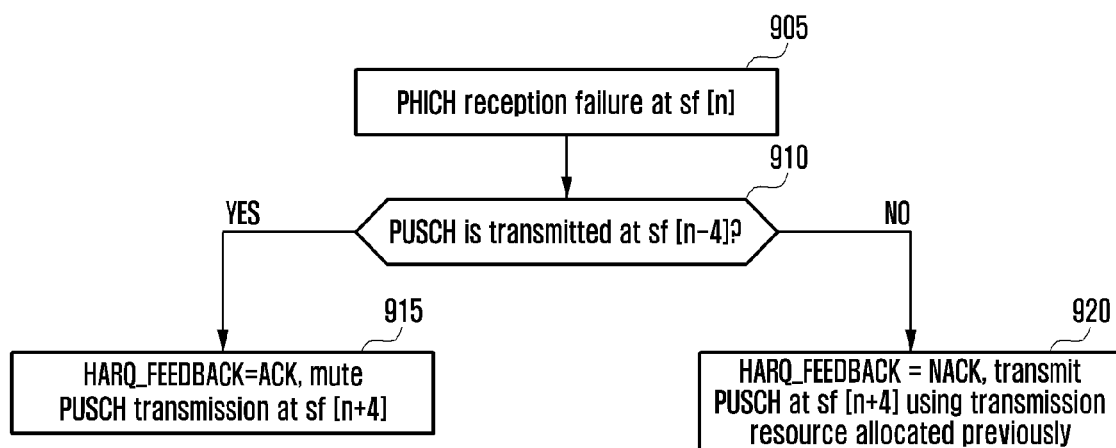
FIG. 9 is a flowchart illustrating the PUSCH transmission procedure according to the second alternative example of the second embodiment of the present invention.

FIG. 9 is a flowchart illustrating the PUSCH transmission procedure according to the second alternative example of the second embodiment of the present invention.

At step 905, the UE fails receiving HARQ feedback which is scheduled at sf [n] due to the reason such as measurement gap, autonomous denial, and RF frontend adjustment.

At step 910, the UE determines whether the PUSCH transmission corresponding to the HARQ feedback is performed at sf [n−4]. Since the time duration of autonomous denial is short typically, the probability of PUSCH transmission is also tiny. That is, although PUSCH has been transmitted, it is likely to fail receiving a feedback. Otherwise, it takes over 4 ms to perform RF frontend bandwidth adjustment, it may fail transmitting PUSCH and receiving feedback. If the PUSCH is transmitted at sf [n−4], the procedure goes to step 915 and, otherwise if the PUSCH is not transmitted at sf [n−4], step 920.

If the procedure goes to step 915, this means that the UE has transmitted PUSCH but received no feedback and, in this case, the UE sets HARQ_FEEDBACK to ACK and does not perform retransmission at sf [n+4] in consideration of the probability in which the eNB has received PUSCH successfully.

If the procedure goes to step 920, this means that the UE has neither transmitted PUSCH nor received any feedback and, in this case, the UE sets HARQ_FEEDBACK to NACK and perform adaptive retransmission at sf [n+4].

In the case of performing autonomous denial, it is preferred for the UE to perform the follow-up operation depending on the kind of the LTE signal transmitted at a certain time for the autonomous denial.

Figure 10:
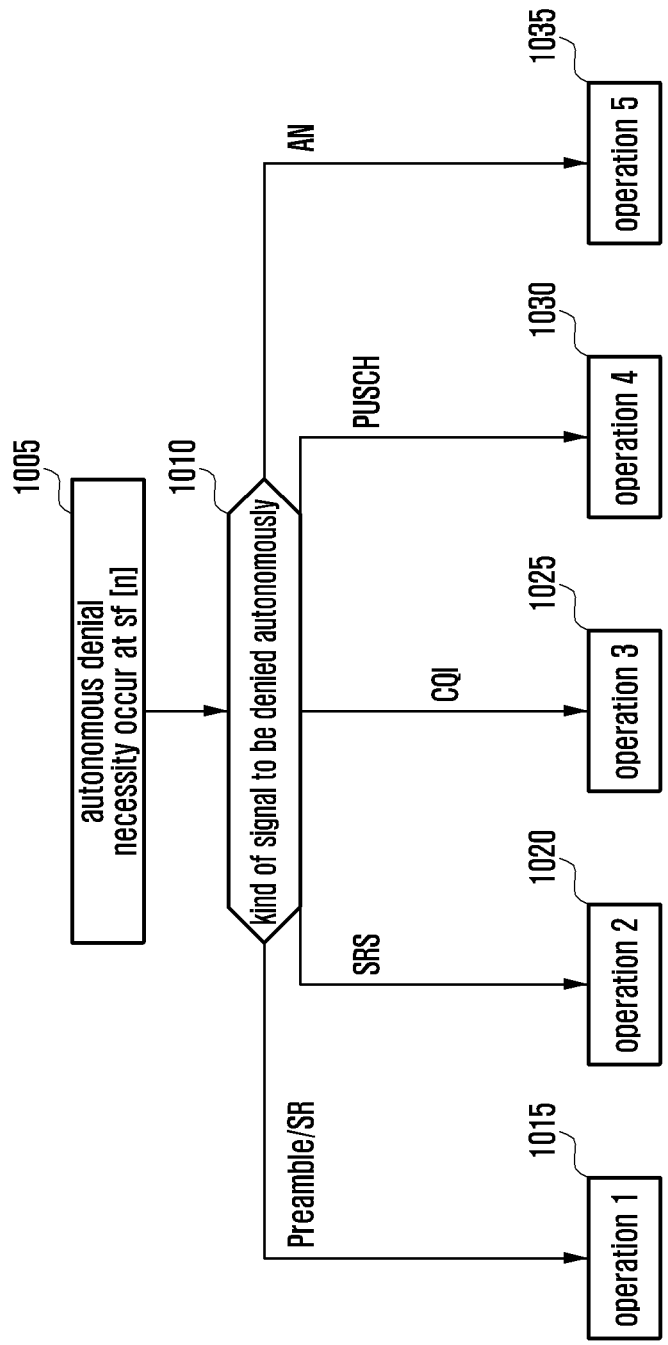
FIG. 10 is a flowchart illustrating the PUSCH transmission procedure according to the third alternative example of the second embodiment of the present invention.

FIG. 10 is a flowchart illustrating the PUSCH transmission procedure according to the third alternative example of the second embodiment of the present invention.

At step 1005, a necessity of performing autonomous denial occurs at the UE.

For example, it occurs that the UE has to receive important control signal concerning wireless local area network or Bluetooth for a predetermined time duration.

The UE determines whether there is any uplink transmission overlapped with the duration for receiving the control signal from other radio communication device at least partially at step 1010 and, if so, checks the type of the uplink transmission. If there is no such uplink transmission, UE performs normal operation. That is the UE receives the signal from the other radio communication device.

If the uplink transmission is of random access preamble or SR, the UE performs operation 1 at step 1015. The SR (Scheduling Request) is a 1-bit signal for the UE to request the eNB for transmission resource allocation and, SR transmission resource may be allocated per UE dedicatedly.

If the uplink transmission to be denied autonomously is SRS, the UE perform operation 2 at step 1020.

If the uplink transmission to be denied autonomously is CQI, the UE perform operation 3 at step 1025.

If the uplink transmission to be denied autonomously is PUSCH, the UE perform operation 4 at step 1030.

If the uplink transmission to be denied autonomously is HARQ feedback, the UE perform operation 5 at step 1035.

Descriptions are made of the operations of the UE hereinafter.

[Operation 1]—Step 1015

If the signal to be denied autonomously is the preamble, the UE operates as follows.

If the preamble is transmitted initially, the autonomous denial is applied and, otherwise the preamble is retransmitted, the autonomous denial is not applied.

If a number of preamble transmission times available (i.e. difference value between the number of preamble transmissions until not and the maximum number of transmissions) is equal to or greater than a predetermined threshold value, the autonomous denial is applied and, otherwise, the autonomous denial is not applied and the preamble transmission is not performed.

If the autonomous denial is applied, i.e. if the preamble is not transmitted, the parameter counting the number of preamble transmissions is maintained and the preamble is transmitted at the subframe available for preamble transmission which is closest to the subframe where the autonomous denial is terminated.

If the signal to be autonomously denied is SR, the UE operates as follows.

The SR is triggered by normal BSR. The normal BSR is triggered when new data having a priority higher than that of the data stored in the UE. If the priority of the data concerning the SR trigger is lower than a predetermined threshold value, the autonomous denial is applied, and otherwise, the autonomous denial is not applied. If the data concerning SR trigger is the data of a predetermined logical channel, e.g. Dedicated Control Channel (DCCH) which is the dedicated local channel processing RRC control message, the autonomous denial is not applied (i.e. transmits SR) and, otherwise if the data is of other logical channel, the autonomous denial is applied.

If SR is not transmitted due to the autonomous denial, the UE maintains the parameter counting the number of SR transmission and transmits the SR at the subframe having SR transmission resource which is closest to the subframe at which the autonomous denial is terminated.

[Operation 2]—Step 1020

If the signal to be denied autonomously is SRS, the UE applies the autonomous denial.

[Operation 3]—Step 1025

If the signal to be denied autonomously is CQI, the UE does not apply the autonomous denial.

[Operation 4]—Step 1030

If the signal to be denied autonomously is PUSCH, the UE applies the autonomous denial. According to an alternative embodiment, if the number of available remained retransmission times (i.e. difference value between the maximum number of transmission times and CURRENT_TX_NB) is equal to or greater than a predetermined threshold, the autonomous denial is applied and, otherwise, the autonomous denial is not applied. According to another alternative embodiment, if the autonomous denial has been applied to the packet in the current HARQ process, the UE does not apply the autonomous denial and, otherwise, applies the autonomous denial.

[Operation 5]—Step 1035

If the signal to be denied autonomously is the HARQ feedback, the UE does not apply the autonomous denial.

<Third Embodiment>

Figure 11:
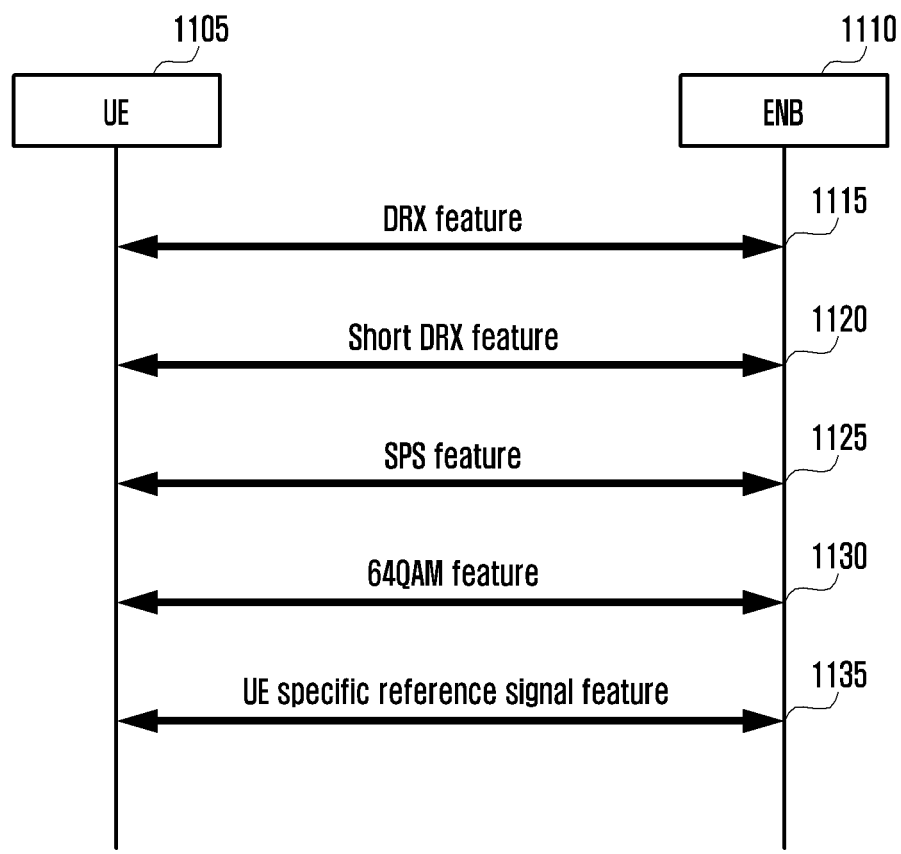
FIG. 11 is signal flow diagram illustrating the function configuration procedure between the UE 1105 and the eNB 1110.

FIG. 11 is signal flow diagram illustrating the function configuration procedure between the UE 1105 and the eNB 1110.

The UE 1105 and the eNB 1110 may configure various functions depending on the capability of the UE 1105 and the situation of the eNB 1110.

For example, the UE 1105 and the eNB 1110 may configure DRX for battery saving of the UE 1105 at step 1115. At step 1120, the UE 1105 and the eNB 1110 may configure short DRX for maximizing the battery saving appropriate for the traffic condition. At step 1125, the UE 1105 and the eNB 1110 may configure semi-persistent scheduling for supporting voice service efficiently. At step 1130, the UE 1105 and the eNB 1110 may configure 64QAM function for increase of data rate of the UE 1105 near the eNB 1110. At step 1135, the UE 1105 and the eNB 1110 may configure UE-specific reference signal. Steps 1115 to 1135 may be performed selectively.

In order for the eNB 1110 to configure specific functions to the UE depending on the situation, the eNB has to know whether the UE 1105 has the capability of the corresponding function and Interoperability test (IOT) has been performed.

Particularly in the case of the dual mode UE supporting both the Frequency Duplex Division (FDD) and Time Duplex Division (TDD), certain functions may be supported in one mode or the IOT for certain functions may be performed for one mode. At this time, it is necessary for the UE to report the operation mode for supporting a certain function and for which the IOT has been performed to the eNB. Typically, the UE supports a plurality of Radio Access Technologies (RATs) and performs communication in the RAT which is best at the corresponding time. At this time, the UE may have to perform capability report on other RATs as well as the current RAT. This embodiment proposes a method and apparatus for reporting LTE FDD capability and LTE TDD capability selectively in the state that the UE is connected to the UMTS network.

Figure 12:
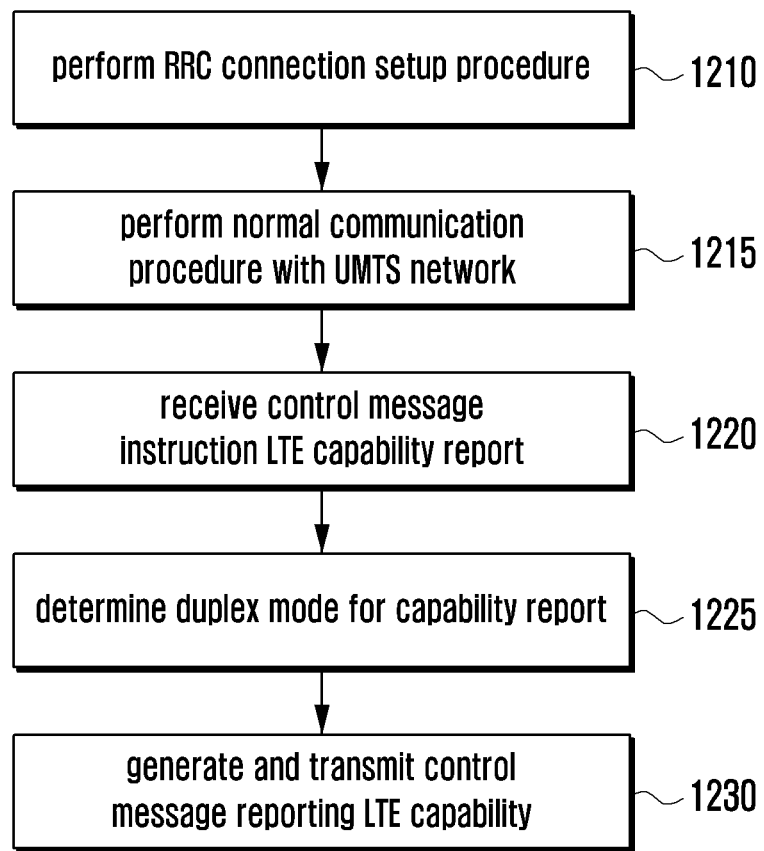
FIG. 12 is a flowchart illustrating a communication procedure according to the third embodiment of the present invention.

FIG. 12 is a flowchart illustrating a communication procedure according to the third embodiment of the present invention.

The UE 1105 configures an RRC connection with the UMTS network at step 1210. This is performed in such a way that the UE 1105 sends the eNB 1110 an RRC CONNECTION REQUEST message, the eNB 110 sends the UE 1105 an RRC CONNECTION SETUP message, and the UE sends the eNB an RRC CONNECTION SETUP COMPLETE message. Once the RRC connection has been established, the UE 1105 performs communication using WCDMA technology (or other similar technology) on the UMTS network at step 1215. The operation of step 1215 may include configuring, at the UE 1105, measurement according to the instruction of the network, measures cells around, reports the measurement result, and performing handover to another cell according to the instruction of the network.

Next, the UE 1105 receives a control message instructing to report LTE capability from the eNB 1110 at a certain time at step 1120.

At step 1225, the UE 1105 determines whether to report LTE FDD capability or LTE TDD capability as follows.

If the LTE frequency for which the eNB is instructed to perform measurement is present at the corresponding time and if the LTE frequency belongs to the FDD band, the UE 1105 determines to report LTE FDD capability. If the LTE frequency belongs to the TDD band, the UE 1105 determines to report LTE TDD capability.

If both the FDD and TDD bands frequencies are present as LTE frequency for which the eNB 1105 is instructed to perform measurement, the UE 1105 may determine to report the LTE capability selected arbitrarily between the LTE FDD and TDD capabilities.

If the LTE frequency for which the eNB is instructed to perform measurement is absent, the UE 1105 determines whether the LTE frequency information is present in the neighbor cell information of the system information. If present, the UE determines to report the LTE FDD capability when the LTE frequency information is of FDD band frequency and the LTE TDD capability when the LTE frequency information is of TDD band frequency. If the LTE frequency information of the neighbor cell information includes FDD and TDD bands frequencies, the UE 1105 selects one of the LTE FDD and TDD capabilities and reports the selected mode capability.

The LTE FDD capability means the LTE capability determined in consideration of only the LTE FDD band. In more detail, the FGI bit of the Feature Group Indicator (FGI) set of the LTE FDD capability information is configured to indicate whether the corresponding feature group as passed IOT test on the FDD band. Also, the supportability of various optional features supported on the FDD band and passed IOT is reported.

Likewise, the LTE TDD capability means the capability determined in consideration of only the LTE TDD band.

The UE 1105 generates the control message containing the LTE FDD capability or LTE TDD capability according to the determination result and transmits the control message to the network at step 1230.

<Fourth Embodiment>

In order to perform downlink HARQ operation, it is necessary for the UE to store the data that are not decoded successfully, and the storage space for the data is referred to as soft buffer. The soft buffer size is an indicator related to the UE capability and expressed as total number of soft channel bits. Since the data transmission and retransmission are performed per HARQ process (or Transport Block; TB), the soft buffer is managed per HARQ processor or TB. In the following description, the terms "HARQ process" and "TB" are interchangeably used. Although the TB is the term indicating the data processed in the HARQ process originally, since if MIMO is configured two TBs are processed in one HARQ process and thus soft buffer size is determined per TB rather than per HARQ process. In more detail, the software buffer size per TB is determined by equation (1).

$$N_{IR} = \left\lfloor \frac{N_{soft}}{K_C \cdot K_{MIMO} \cdot \min(M_{DL\_HARQ}, M_{limit})} \right\rfloor \quad (1)$$

Details on the above equation is specified in 3GPP TS 36.211 and briefly explained as follows.

$N_{soft}$ denotes the number of soft channel bits of the UE and its value is defined per UE category as an integer indicating the UE capability.

$K_c$ denotes a parameter related to the number of carriers and has one of 1, 2, and 5.

$K_{MIMO}$ denotes the parameter related to MIMO configuration and is set to 2 when MIMO is configured and, otherwise, 1.

$M_{DL\_HARQ}$ denotes a value indicating a number of HARQ processes configured currently to the UE. It has a fixed value of 8 in FDD system and a value determined according to the TDD configuration in TDD system as shown in table 1.

TABLE 1

| TDD Uplink-downlink configuration | # of DL HARQ process |
|---|---|
| 0 (2DL-2S-6UL) | 4 |
| 1 (4DL-2S-4UL) | 7 |
| 2 (6DL-2S-2UL) | 10 |
| 3 (6DL-1S-3UL) | 9 |
| 4 (7DL-1S-2UL) | 12 |
| 5 (8DL-1S-1UL) | 15 |
| 6 (3DL-2S-5UL) | 6 |

$M_{limit}$ denotes a parameter for prevent the soft buffer size from decreasing excessively when many HARQ processes are configure, and size of $M_{limit}$ is 8. That is, it gives an effect of configuring the soft buffer as if the maximum number of HARQ processes is 8.

Since the soft channel bit may influence the price of the UE, it is important to secure an appropriate size of the soft channel bit storage space. Theoretically, as the number of soft channel bits increases, the HARQ capability increases; and as the number of soft channel bits decreases, the HARQ capability decreases. Meanwhile, since it is rare that all of the HARQ processes are running in a certain given duration, it is efficient to prepare the soft buffer capable of guaranteeing the maximum capability per HARQ process in view of cost. For this reason, although the TDD system can be configured with 8 or more HARQ processes, the maximum value of $\min(M_{DL\_HARQ}, M_{limit})$ as the input related to the number of HARQ processes is limited to 8. In the case that the soft buffer is determined as above per TB, it may occur that new data is received while all the HARQ processes are running. In this case, the UE selects one of the soft buffers filled with data already to store the new data. At this time, it is important to select an appropriate soft buffer in view of HARQ performance.

The present embodiment proposes a method and apparatus for the UE to select the soft buffer for storing the newly received data.

Figure 13:
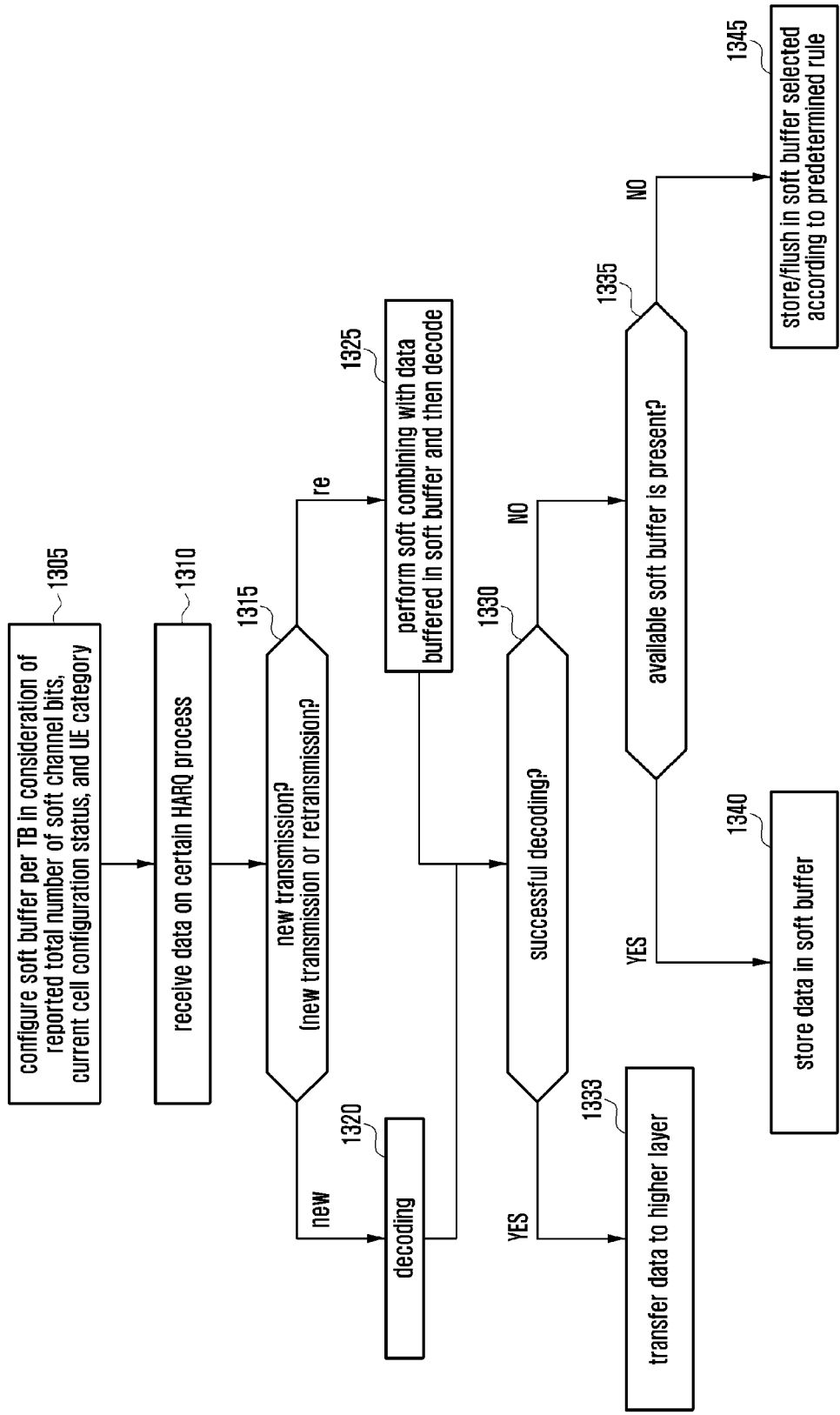
FIG. 13 is a flowchart illustrating a soft buffer processing procedure of the UE according to the fourth embodiment of the present invention.

FIG. 13 is a flowchart illustrating a soft buffer processing procedure of the UE according to the fourth embodiment of the present invention.

At step 1305, the UE reports its category information to the network and determines the size of the soft buffer per TB in consideration of the number of soft channel bits and current MIMO configuration in association with the reported category. The category of the UE is of indexing the representative capability information of the UE and categorized as shown in table 2.

TABLE 2

| UE Category | Maximum number of DL-SCH transport block bits received within a TTI (Note) | Maximum number of bits of a DL-SCH transport block received within a TTI | Total number of soft channel bits | Maximum number of supported layers for spatial multiplexing in DL |
|---|---|---|---|---|
| Category 1 | 10296 | 10296 | 250368 | 1 |
| Category 2 | 51024 | 51024 | 1237248 | 2 |
| Category 3 | 102048 | 75376 | 1237248 | 2 |
| Category 4 | 150752 | 75376 | 1827072 | 2 |
| Category 5 | 299552 | 149776 | 3667200 | 4 |
| Category 6 | 301504 | 149776 (4 layers), 75376 (2 layers) | 3654144 | 2 or 4 |
| Category 7 | 301504 | 149776 (4 layers), 75376 (2 layers) | 3654144 | 2 or 4 |
| Category 8 | 2998560 | 299856 | 35982720 | 8 |

The UE determines the soft buffer size per TB using the total number of soft channel bits and the maximum number of supported layers for spatial multiplexing in DL among the above parameters.

Afterward, the UE performs normal downlink HARQ operation as follows.

At step 1310, the UE receives data for a certain TB of a certain HARQ process. At step 1315, the UE determines whether the data is the newly transmitted data or retransmitted data using the HARQ process identifier and New Data Indicator (NDI) indicated in the downlink assignment information. The UE manages NDI per TB of HARQ process and, if NDI is toggled, determines the received data as new data and, otherwise, as retransmitted data. If the received data are new data, the procedure goes to step 1320 and, otherwise if the received data are retransmitted data, step 1325.

At step 1320, the UE decodes the received data.

At step 1325, the UE performs soft combining on the received data and the data of the same TB stored in the soft buffer and decoding on soft-combined data. If there is not data for soft combining, the UE performs decoding on only the received data.

At step 1330, the UE determines whether the data have been decoded successfully. If the data have been decoded successfully, the UE transfers the decoded data to a higher layer and transmits HARQ feedback ACK at step 1333. Then the UE waits for next new data. If the data have not been decoded successfully, the procedure goes to step 1335.

The UE determines whether any available soft buffer is present at step 1335. In the case of FDD system, the available soft buffer is present always, however, in the TDD system operating with one of TDD configuration 2, 3, 4, and 5, any available soft buffer may not be present. If there is not available soft buffer when the UE has received the data on a certain HARQ process x (or certain TB y), this is means that all of the soft buffers configured to the UE have buffered data of other HARQ process than the HARQ process x (or other TB than TB y).

If any available soft buffer is present, the UE stores the data in the soft buffer and transmits HARQ NACK at step 1340. Then the UE waits for receiving next new data.

If any available soft buff is absent, the UE selects a soft buffer to store the received data according to a predetermined rule and transmits an HARQ feedback at step 1345.

The predetermine rule may be defined exemplarily as follows.

[Soft Buffer Selection and HARQ Feedback Transmission Rule]

1. If there is at least one soft buffer storing already the data decoded successfully, the UE selects power of the at least one soft buffer arbitrarily to substitute the data stored in the selected soft buffer with the received data and transmits NACK as HARQ feedback. If there is no soft buffer fulfilling the above condition, the following rule is applied.

2. The UE selects the soft buffer storing the data smallest in size by comparing the data stored in the soft buffer with the received data. The UE substitutes the data stored in the soft buffer with the received data and transmits NACK as HARQ feedback. If the received data is the smallest in size, the UE discards the received data and transmits ACK as HARQ feedback.

According to rule 1, the UE does not discard, although the decoding has completed successfully, the data from the HARQ buffer but discard the successfully decoded data when the new data of the same TB as the data are received, and stores the received data. Accordingly, although all of the soft buffers of the UE are filled with data at a certain time, some of them may be filled with the successfully decoded data. Unlike the conventional method in which new data of the same HARQ process (or same TB) has to be received for discarding such data, the present invention allows for discarding the data even when new data of different HARQ process (or different TB) are received. In order to accomplish this, the UE has to manage the mapping relationship of the soft buffer and the HARQ process more dynamically. That is, unlike the conventional method in which the mapping relationship is maintained when a certain soft buffer is filled with certain TB data, the present invention is embodied in such a way that a certain soft buffer is filled with certain TB data at a certain time and then other TB data at another certain time. Accordingly, the UE updates the mapping relationship between the soft buffer and the TB continuously.

According to rule 2, the data size means the size in view of the soft channel bits. For example, the size of the data having the size of 100 bits is z bits at initial transmission in view of soft channel bits but may become 2z bits as a result of soft combining at retransmission and then 3z as a result of soft combining at the second retransmission. Since the size in view of soft channel bits is an indicator indicating the amount of entire energy used for transmission, it is preferred for the UE to select the data to be discard using the size in view of the soft channel bits. If the received data is the smallest one in size, the UE discards the received data. In this case, the probability of successful reception of the data through retransmission drops significantly and thus the UE transmits ACK as HARQ feedback for preventing retransmission afterward.

Recently, a method for adjusting TDD configuration dynamically depending on the cell status is under discussion. For example, if downlink traffic amount is great, a TDD configuration having more downlink subframes is applied; and if the uplink traffic amount is great, a TDD configuration having the more uplink subframe to use the given resource efficiently.

In the case that the TDD configuration changes frequently in a short period, $M_{DL\_HARQ}$ changes in correspondence to the TDD configuration too and changes the soft buffer size, resulting in error in downlink HARQ operation.

The present invention proposes a method of fixing the $M_{DL\_HARQ}$ to a specific value in the system in which TDD configuration changes dynamically. Particularly, $M_{DL\_HARQ}$ is applied depending on the situation of the cell so as to improve the utilization efficiency of the soft buffer.

As described above, the basic concept of equation (1) is to determine the size of the soft buffer under the assumption that all HARQ processes and all TBs configured to the UE are used continuously. Particularly in the case that MIMO is configured, the size of the soft buffer is determined under the assumption that two data re transmitted to the UE at every subframe through MIMO. The MIMO operation is applied to the case where the channel condition of the UE is good and thus, although MIMO is configured to the UE, the MIMO is likely to be applied at a tiny part of the entire time duration. Accordingly, the probability in which the UE configured with MIMO uses all TBs continuously (i.e. probability in which two data are transmitted at all subframes) is very low as compared to the probability in which the UE without MIMO configuration uses all TBs continuously (i.e. probability in which one data is transmitted at all subframes). Accordingly, if the same $M_{DL\_HARQ}$ is applied to both the cases with and without MIMO configuration, the soft buffer utilization efficiency is likely to be degraded.

In this embodiment, three kinds of $M_{DL\_HARQ}$ are defined.

$M_{DL\_HARQ}$ 1: Value used in the system in which TDD configuration does not change dynamically. The UE checks $M_{DL\_HARQ}$ from the TDD configuration broadcast through system information.

$M_{DL\_HARQ}$ 2: Value used without MIMO configuration in the system in which TDD configuration changes dynamically. The value is negotiated between the UE and the eNB or configured using a predetermined control message transmitted from the eNB to the UE.

$M_{DL\_HARQ}$ 3: Value used with MIMO configuration in the system in which TDD configuration changes dynamically. The value is negotiated between the UE and the eNB or configured using a predetermined control message transmitted from the eNB to the UE.

The UE determines a kind of $M_{DL\_HARQ}$ to be used at a certain time in consideration of dynamic change of TDD configuration and MIMO configuration.

Figure 14:
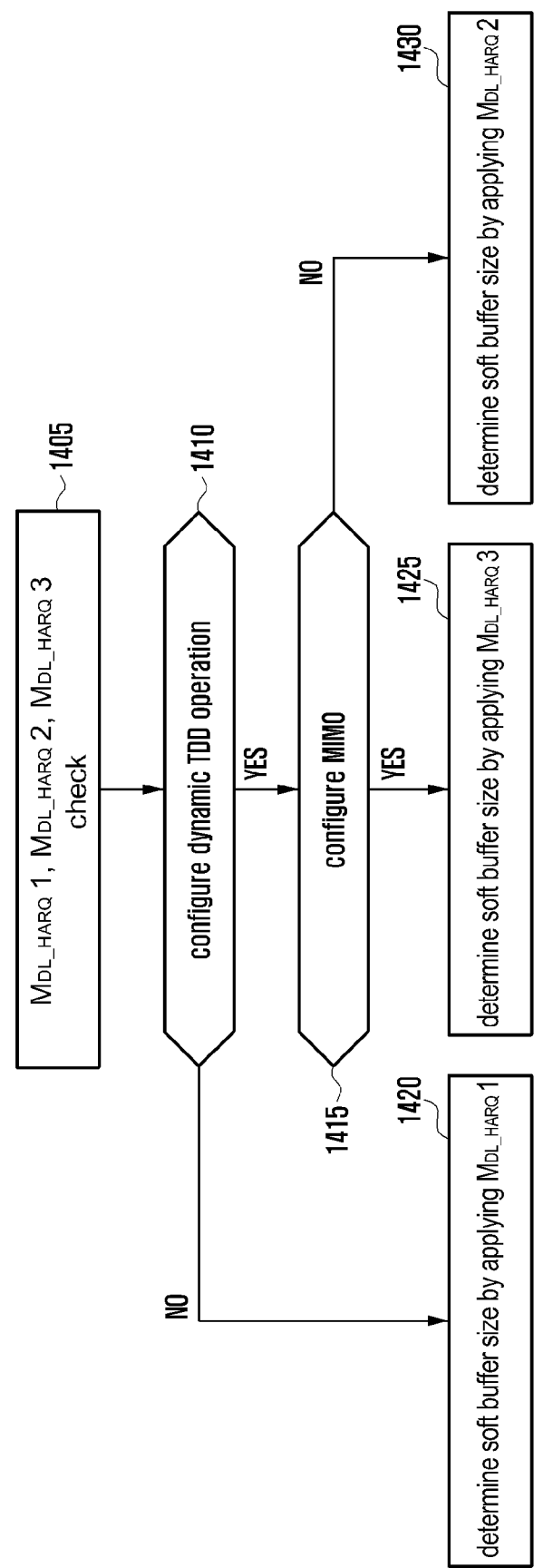
FIG. 14 is a flowchart illustrating the soft buffer size determination procedure of the UE according to an embodiment of the present invention.

FIG. 14 is a flowchart illustrating the soft buffer size determination procedure of the UE according to an embodiment of the present invention.

At step 1405, the UE checks $M_{DL\_HARQ}$ 1, $M_{DL\_HARQ}$ 2, and $M_{DL\_HARQ}$ 3. As described above, $M_{DL\_HARQ}$ 1 is the parameter broadcast through system information, and $M_{DL\_HARQ}$ 2 and $M_{DL\_HARQ}$ 3 are parameters of which values are fixed or notified to the UE through a dedicated RRC message.

At step 1410, the UE determines whether the dynamic TDD operation is configured. The dynamic TDD operation means the operation of changing the TDD configuration dynamically. In the dynamic TDD operation, the TDD configuration may changes at a predetermined interval, and the TDD configuration to be applied at $n^{th}$ time duration may be notified to the UE at a predetermined subframe of $(n-1)^{th}$ time duration. Some of the subframes may be used as flexible subframes. The flexible subframe means the subframe which can be used as downlink subframe or uplink subframe depending on the cell status.

Not all the cells support the dynamic TDD operation, and not all the UEs support the dynamic TDD operation. The UE indicates whether it supports dynamic TDD operation in its capability report, and the eNB determines whether to configure dynamic TDD operation to the UE in consideration of current cell status.

If the dynamic TDD operation is not configured, the UE configures the soft buffer by applying $M_{DL\_HARQ}$ 1 at step 1420.

If the dynamic TDD operation is configured, the UE determines whether the MIMO is configured at step 1415. Or the UE checks the configured Transmission Mode (TM) to determine whether to configure MIMO. If MIMO is configured, the UE configures the soft buffer by applying $M_{DL\_HARQ}$ 3 at step 1425. If MIMO is not configured, the UE configures the soft buffer by applying $M_{DL\_HARQ}$ 2 at step 1430.

Figure 15:
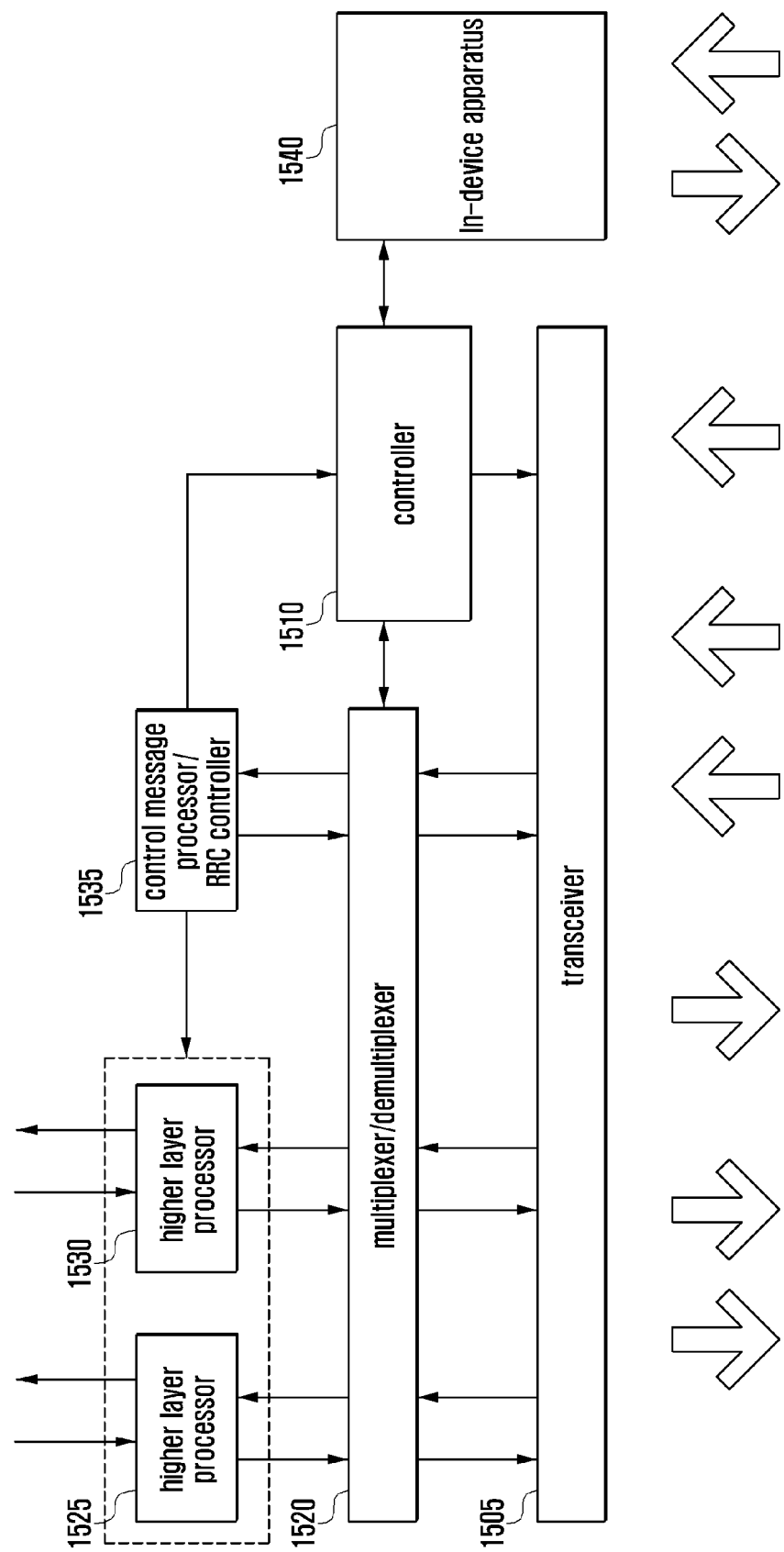
FIG. 15 is a block diagram illustrating a configuration of the UE according to an embodiment of the present invention.

FIG. 15 is a block diagram illustrating a configuration of the UE according to an embodiment of the present invention.

Referring to FIG. 15, the UE according to an embodiment of the present invention includes a transceiver 1505, a controller 1010, a multiplexer/demultiplexer 1520, a control message processor/RRC controller 1530, various higher layer processors 1525 and 1530, and an in-device apparatus 1540.

The transceiver 1505 receives data and control signals through downlink channel of the serving cell and transmits data and control signals through uplink channel. In the case that a plurality of serving cells is configured, the transceiver 1505 performs data and controls signal transmissions through the plural serving cells.

The multiplexer/demultiplexer 1520 multiplexes the data generated by the higher layer processors 1525 and 1530 and the control message processor 1535 and demultiplexes the data received by the transceiver 1505 and transfers the demultiplexed data to the higher layer processors 1525 and 1530 and the control message processor 1535.

The control message processor 1535 is the RRC layer device and takes an action necessary for processing the control message received from the eNB. For example, the control message processor 1530 receives an RRC control message and transfers DRX information to the controller 1510. The control message processor 1530 also performs the LTE capability report operation as depicted in FIG. 12.

The higher layer processors 1525 and 1530 may be implemented per service. Higher layer processor processes the data generated by user service such as File Transfer Protocol (FTP) and Voice over Internet Protocol (VoIP) and transfers the processing result to the multiplexer/demultiplexer 1520 and processes the data from the multiplexer/demultiplexer 1520 and transfers the processed data to the higher layer service application. The higher layer processor may be any of RLC layer device, PDCP layer device, and IP layer device.

The controller 1510 checks the scheduling command, e.g. uplink grant, received by the transceiver 1505 and controls the transceiver 1505 and the multiplexer/demultiplexer 1515 to perform uplink transmission using appropriate transmission resource at an appropriate time. The controller 1510 also perform the operations according to embodiments of the present invention as described with reference to FIGS. 4, 5, 7, 8, 9, 10, 13, and 14. That is, the controller perform DRX operation, controls CSI and SRS transmissions, processes transmission-related parameters, controls monitoring PDCCH and PHICH selectively, determines whether to perform autonomous denial depending on the characteristic of the signal to be denied autonomously, and manages the soft buffer.

The in-device apparatus 1540 is the apparatus of which reception performance may drop significantly due to the LTE radio transmission such as WLAN apparatus or Bluetooth apparatus. If an important control signal is received, the in-device apparatus notifies the controller 1510 of this.

Figure 16:
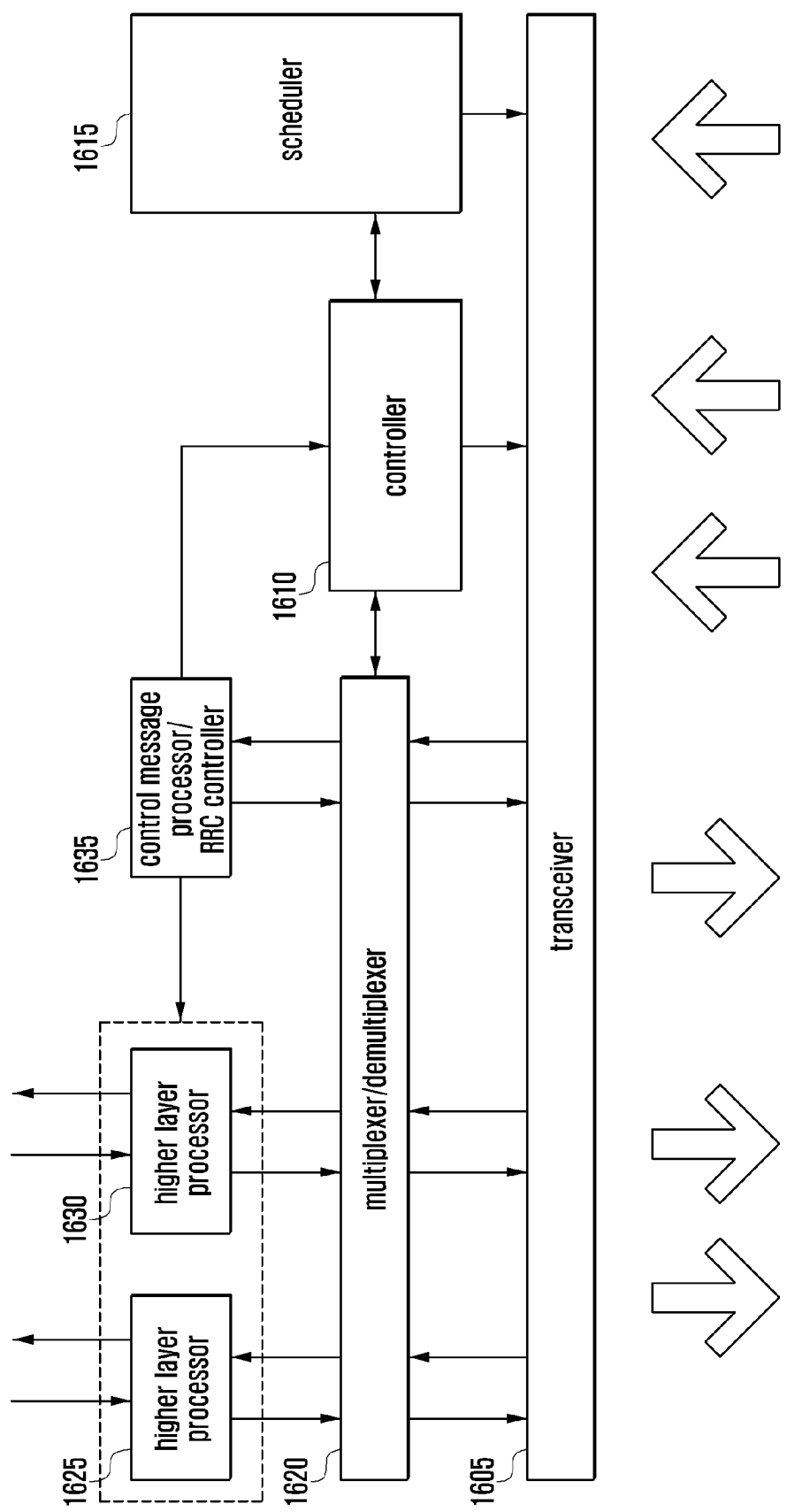
FIG. 16 is a block diagram illustrating a configuration of the eNB according to an embodiment of the present invention.

FIG. 16 is a block diagram illustrating a configuration of the eNB according to an embodiment of the present invention, and the eNB includes a transceiver 1650, a controller 1610, a multiplexer/demultiplexer 1620, a control message processor/RRC controller 1635, various higher layer processors 1623 and 1630, and a scheduler 1615.

The transceiver 1605 transmits data and controls signals through downlink carriers and receives data and control signals through uplink carriers. In the case that a plurality of carriers is configured, the transceiver 1605 performs data and control signal communication through the plural carriers.

The multiplexer/demultiplexer 1620 is responsible for multiplexing data generated by the higher layer processor 1625 and 1630 and the control message processor 1635 and demultiplexes the data received by the transceiver 1605 and delivers the demultiplexed data to the higher layer processor 1625 and 1630, the control message processor 1635, and the controller 1610. The control message processor 1635 processes the control message transmitted by the UE to take a necessary action and generates the control message to be transmitted to the UE to the higher layer.

The higher layer processors 1625 and 1630 may be implemented per bearer and processes the data from SGW or other eNB to generate RLC PDU to the multiplexer/demultiplexer 1620 and processes RLC PDU from the multiplexer/demultiplexer 1620 to generate PDCP SDU to the SGW or other eNB.

The scheduler allocates transmission resource to the UE at an appropriate time in consideration of buffer state and channel condition of the UE and controls the transceiver to process the signal transmitted by the UE or to be transmitted to the UE.

The controller 1610 performs various control operations related to the UE operation as proposed in FIGS. 4, 5, and 14. For example, the controller performs decoding on PUSCH under the assumption that the UE transmits PUSCH and CQI simultaneously and decoding on PUSCH under the assumption that the UE transmits HARQ AN and CQI. The controller 161 also determines the size of the soft buffer in consideration of the dynamic TDD operation and MIMO configuration to the UE.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Furthermore, the respective block diagrams may illustrate parts of modules, segments or codes including at least one or more executable instructions for performing specific logic function(s). Moreover, it should be noted that the functions of the blocks may be performed in different order in several modifications. For example, two successive blocks may be performed substantially at the same time, or may be performed in reverse order according to their functions.

The term "module" according to the embodiments of the invention, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

It is to be appreciated that those skilled in the art can change or modify the embodiments without departing the technical concept of this invention. Accordingly, it should be understood that above-described embodiments are essentially for illustrative purpose only but not in any way for restriction thereto. Thus the scope of the invention should be determined by the appended claims and their legal equivalents rather than the specification, and various alterations and modifications within the definition and scope of the claims are included in the claims.

Although preferred embodiments of the invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

The invention claimed is:

1. A method by a terminal in a wireless communication system, the method comprising:
    receiving data for a certain transport block of a hybrid automatic repeat request (HARQ) process;
    identifying whether an available soft buffer exists if the received data is not decoded successfully; and
    if the available soft buffer does not exist, selecting, based on a predetermined rule, a soft buffer storing data to store the received data,
    wherein the selecting of the soft buffer comprises:
        identifying at least one soft buffer storing data which is already decoded successfully; and
        selecting one of the at least one soft buffer to substitute the data stored in the selected soft buffer with the received data.

2. The method of claim 1, further comprising:
    transmitting a negative acknowledge as an HARQ feedback after storing the received data in the selected soft buffer.

3. The method of claim 1, wherein the selecting of the soft buffer comprises:
    comparing a size of the received data with a size of data stored in a soft buffer which stores the smallest data among a plurality of soft buffers; and
    if the received data is larger than the smallest data, selecting the soft buffer which stores the smallest data among the plurality of soft buffers to substitute the smallest data stored in the selected soft buffer with the received data.

4. The method of claim 3, further comprising:
    transmitting a negative acknowledge as an HARQ feedback after storing the received data in the selected soft buffer.

5. The method of claim 3, further comprising:
    if the received data is smaller than the smallest data, discarding the received data.

6. The method of claim 5, further comprising:
    transmitting an acknowledge as an HARQ feedback after discarding the received data.

7. A terminal in a wireless communication system, the terminal comprising:
a transceiver configured to transmit and receive a signal; and
a controller configured to:
receive, through the transceiver, data for a certain transport block of an hybrid automatic repeat request (HARQ) process,
identify whether an available soft buffer exists if the received data is not decoded successfully,
select, based on a predetermined rule, a soft buffer storing data to store the received data if the available soft buffer does not exist,
identify at least one soft buffer storing data which is already decoded successfully, and
select one of the at least one soft buffer to substitute the data stored in the selected soft buffer with the received data.

8. The terminal of claim 7, wherein the controller is further configured to:
transmit, through the transceiver, a negative acknowledge as an HARQ feedback after storing the received data in the selected soft buffer.

9. The terminal of claim 7, wherein the controller is further configured to:
compare a size of the received data with a size of data stored in a soft buffer which stores the smallest data among a plurality of soft buffers; and
if the received data is larger than the smallest data, select the soft buffer which stores the smallest data among the plurality of soft buffers to substitute the smallest data stored in the selected soft buffer with the received data.

10. The terminal of claim 9, wherein the controller is further configured to:
transmit, through the transceiver, a negative acknowledge as an HARQ feedback after storing the received data in the selected soft buffer.

11. The terminal of claim 9, wherein the controller is further configured to:
if the received data is smaller than the smallest data, discard the received data.

12. The terminal of claim 11, wherein the controller is further configured to:
transmit, through the transceiver, an acknowledge as an HARQ feedback after discarding the received data.

* * * * *